(12) United States Patent
Low et al.

(10) Patent No.: US 12,218,586 B2
(45) Date of Patent: Feb. 4, 2025

(54) CHARGE ADJUSTMENT TECHNIQUES FOR SWITCHED CAPACITOR POWER CONVERTER

(71) Applicant: pSemi Corporation, San Diego, CA (US)

(72) Inventors: Aichen Low, Cambridge, MA (US); David M. Giuliano, Bedford, NH (US); Gregory Szczeszynski, Nashua, NH (US); Jeff Summit, Jefferson, MA (US); Oscar Blyde, Melrose, NJ (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 18/606,285

(22) Filed: Mar. 15, 2024

(65) Prior Publication Data

US 2024/0372466 A1 Nov. 7, 2024

Related U.S. Application Data

(63) Continuation of application No. 18/049,302, filed on Oct. 25, 2022, now Pat. No. 11,955,885, which is a
(Continued)

(51) Int. Cl.
*H02M 3/07* (2006.01)
*H02M 1/00* (2006.01)

(52) U.S. Cl.
CPC ............ *H02M 3/07* (2013.01); *H02M 3/073* (2013.01); *H02M 1/0003* (2021.05); *H02M 3/075* (2021.05)

(58) Field of Classification Search
CPC ........ H02M 3/07; H02M 3/073; H02M 3/075; H02M 1/0003
See application file for complete search history.

(56) References Cited

U.S. PATENT DOCUMENTS 6,198,645 B1 3/2001 Kotowski
6,362,608 B1 3/2002 Ashburn et al.
(Continued)

FOREIGN PATENT DOCUMENTS

JP   H 11113249 A   4/1999
JP   2007336753 A   12/2007
(Continued)

OTHER PUBLICATIONS

Jiang, Jun et al., "Development and Production of ZCS Soft Switching Converter-based Gate Driver IC," 2009 IEEE 8th International Conference on ASIC, Changsha, China, 2009, pp. 1058-1061.
(Continued)

*Primary Examiner* — Rafael O De Leon Domenech
(74) *Attorney, Agent, or Firm* — Haynes and Boone, LLP

(57) ABSTRACT

An apparatus for converting a first voltage into a second voltage includes a reconfigurable switched capacitor power converter having a selectable conversion gain. The power converter has switch elements configured to electrically interconnect capacitors to one another and/or to the first or second voltage in successive states. The switch elements are configured to interconnect at least some capacitors to one another through the switch elements. A controller causes the reconfigurable switched capacitor power converter to transition between first and second operation modes. The controller minimizes electrical transients arising from transition between modes. In the first operating mode, the power converter operates with a first conversion gain. In the second operating mode, it operates with a second conversion gain.

22 Claims, 17 Drawing Sheets

Related U.S. Application Data continuation of application No. 17/239,533, filed on Apr. 23, 2021, now Pat. No. 11,522,445, which is a continuation of application No. 17/079,379, filed on Oct. 23, 2020, now Pat. No. 11,038,418, which is a continuation of application No. 16/451,616, filed on Jun. 25, 2019, now Pat. No. 10,985,651, which is a continuation of application No. 14/899,887, filed as application No. PCT/US2014/024143 on Mar. 12, 2014, now Pat. No. 10,333,392, which is a continuation of application No. 13/839,315, filed on Mar. 15, 2013, now Pat. No. 9,203,299.

(56) References Cited

U.S. PATENT DOCUMENTS

| | | |
|---|---|---|
| 6,411,531 B1 | 6/2002 | Nork et al. |
| 6,486,728 B2 | 11/2002 | Kleveland |
| 6,504,422 B1 | 1/2003 | Rader et al. |
| 6,512,411 B2 | 1/2003 | Meng et al. |
| 6,563,235 B1* | 5/2003 | McIntyre ............... H02M 3/07 307/110 |
| 6,657,875 B1 | 12/2003 | Zeng et al. |
| 7,187,159 B2 | 3/2007 | Katoh |
| 7,239,194 B2 | 7/2007 | Azrai et al. |
| 7,382,113 B2* | 6/2008 | Wai ..................... H02M 3/158 323/266 |
| 7,612,603 B1 | 11/2009 | Petricek et al. |
| 7,724,551 B2 | 5/2010 | Yanagida |
| 7,728,651 B2 | 6/2010 | Nakai |
| 7,956,572 B2* | 6/2011 | Zane .................... H01Q 1/2225 320/108 |
| 8,040,174 B2 | 10/2011 | Likhterov |
| 8,159,091 B2 | 4/2012 | Yeates |
| 8,212,541 B2 | 7/2012 | Perreault |
| 8,503,203 B1 | 8/2013 | Szczeszynski |
| 10,749,434 B2 | 8/2020 | Giuliano et al. |
| 10,938,299 B2 | 3/2021 | Low et al. |
| 10,938,300 B2 | 3/2021 | Giuliano |
| 11,038,418 B2 | 6/2021 | Low et al. |
| 2004/0004851 A1 | 1/2004 | Itoh |
| 2005/0047181 A1 | 3/2005 | Yumamoto et al. |
| 2005/0219878 A1 | 10/2005 | Ito et al. |
| 2006/0244513 A1 | 11/2006 | Yen et al. |
| 2007/0013448 A1 | 1/2007 | Azuhata et al. |
| 2007/0024346 A1 | 2/2007 | Takahashi et al. |
| 2007/0146020 A1* | 6/2007 | Williams ............... H02M 3/158 327/110 |
| 2007/0182390 A1 | 8/2007 | Ishii et al. |
| 2008/0013236 A1* | 1/2008 | Weng ................... H02M 3/156 361/91.1 |
| 2008/0100272 A1 | 5/2008 | Yoshio |
| 2008/0150621 A1 | 6/2008 | Lesso et al. |
| 2008/0158915 A1* | 7/2008 | Williams ............... H02M 3/07 363/21.06 |
| 2009/0039947 A1 | 2/2009 | Williams |
| 2009/0059630 A1* | 3/2009 | Williams ............... H02M 3/1588 363/60 |
| 2009/0072800 A1* | 3/2009 | Ramadass ............... H02M 3/07 323/284 |
| 2009/0121782 A1 | 5/2009 | Oyama et al. |
| 2009/0195298 A1 | 8/2009 | Nakai |
| 2009/0200874 A1 | 8/2009 | Takai |
| 2009/0278520 A1 | 11/2009 | Perreault |
| 2009/0322384 A1 | 12/2009 | Oraw et al. |
| 2010/0039085 A1 | 2/2010 | Petricek |
| 2010/0080023 A1 | 4/2010 | Jain |
| 2010/0085786 A1 | 4/2010 | Chiu |
| 2010/0156369 A1 | 6/2010 | Kularatna et al. |
| 2010/0214014 A1 | 8/2010 | Dennard et al. |
| 2011/0018511 A1 | 1/2011 | Carpenter et al. |
| 2011/0115550 A1 | 5/2011 | Pelley |
| 2011/0128761 A1 | 6/2011 | Ripley et al. |
| 2011/0154068 A1 | 6/2011 | Huang et al. |
| 2011/0156819 A1 | 6/2011 | Kim |
| 2011/0204959 A1 | 8/2011 | Sousa et al. |
| 2011/0204962 A1 | 8/2011 | Gorisse et al. |
| 2012/0200340 A1 | 8/2012 | Shook |
| 2012/0212293 A1 | 8/2012 | Khlat |
| 2012/0293254 A1 | 11/2012 | Liu et al. |
| 2013/0043931 A1 | 2/2013 | Khlat et al. |
| 2013/0063120 A1 | 3/2013 | Hoellinger et al. |
| 2013/0106375 A1 | 5/2013 | Marsili et al. |
| 2013/0106381 A1 | 5/2013 | Marsili |
| 2013/0106382 A1 | 5/2013 | Marsili et al. |
| 2013/0300385 A1 | 11/2013 | Li et al. |

FOREIGN PATENT DOCUMENTS

| | | |
|---|---|---|
| JP | 2009124826 A | 6/2009 |
| JP | 2011072094 A | 4/2011 |
| JP | 2011253217 A | 12/2011 |
| WO | WO2009/155540 A1 | 12/2009 |
| WO | WO2012/171938 A2 | 12/2012 |
| WO | WO2013/085537 A1 | 6/2013 |

OTHER PUBLICATIONS

W. Ng, Vincent et al., "Minimum PCB Footprint Point-of-Load DC-DC Converter Realized with Switched-Capacitor Architecture," 2009 IEEE Energy Conversion Congress and Exposition, San Jose, CA, USA, 2009, pp. 1575-1581.

W. Ng, Vincent et al., "Switched Capacitor DC-DC Converter: Superior where the Buck Converter has Dominated," Aug. 17, 2011, Tech Reports | EECS at UC Berkeley.

Yeung, Y.P. Benny et al., "Unified Analysis of Switched-Capacitor Resonant Converters," Aug. 2004, IEEE Transactions on Industrial Electronics, vol. 51, No. 4, pp. 864-873.

* cited by examiner

CHARGE ADJUSTMENT TECHNIQUES FOR SWITCHED CAPACITOR POWER CONVERTER

CROSS REFERENCE TO RELATED APPLICATION

This application is a continuation of U.S. application Ser. No. 14/899,887, filed Dec. 18, 2015, now U.S. Pat. No. 10,333,392, which is the national phase under 35 USC 371 of international application no. PCT/US2014/024143 filed Mar. 12, 2014 which claims the benefit of the Mar. 15, 2013 priority date of U.S. application Ser. No. 13/839,315, now U.S. Pat. No. 9,203,299, the contents of which are hereby incorporated by reference in their entirety.

FIELD OF DISCLOSURE

The present inventive subject matter relates to techniques for reconfiguring a switched capacitor power converter.

BACKGROUND

A switch-mode power converter is a specific type of power converter that produces an output voltage by switching energy storage elements (i.e. inductors and capacitors) into different electrical configurations using a switch network. A switched capacitor power converter is a type of switch-mode power converter that primarily utilizes capacitors to transfer energy. In such converters, also known as switched capacitor circuits, the number of capacitors and switches increases as the transformation ratio or conversion-gain increases. A switched capacitor circuit that has more than one conversion-gain (i.e. mode) is often refer to as a multi-mode switched capacitor circuit Cascade multipliers are a family of topologies of multi-stage switched capacitor power converters that can provide a high conversion-gain using low-voltage transistors. As used herein, conversion-gain represents a voltage gain if the switched capacitor circuit produces an output voltage that is larger than the input voltage or a current gain if the switched capacitor circuit produces an output voltage VO that is smaller than the input voltage. Energy is transferred from the input to the output by cycling the cascade multiplier network through different topological states. Charge is transfer from the input voltage VI to the output voltage via a charge transfer path. The number and configuration of the capacitors in each topological state sets the conversion-gain. Therefore, by reconfiguring the cascade multiplier network, the conversion gain can be modified.

FIGS. 1A-1B illustrate two known reconfigurable cascade multipliers 20A, 20B that receive an input voltage VI from a voltage source 26 and provide an output voltage VO to a load R1. The cascade multiplier 20A is a single-phase asymmetric cascade multiplier that includes a phase voltage P1, diodes D1-D6, pump capacitors C1-C3, and dc capacitors C4-C6. In contrast, the cascade multiplier 20B is a symmetric cascade multiplier that includes phase voltages P1-P2, diodes D11-D14, and pump capacitors C1-C3.

Both of the cascade multipliers 20A, 20B can produce a maximum output voltage VO of four times the input voltage VI. The conversion-gain can be selected based upon first, second, and third enable signals EN1, EN2, EN3. When the first enable signal ENI is high the output voltage O is three times the input voltage VI; when the first and second enable signals EN1, EN2 are high the output voltage is two times the input voltage VI; and so on.

Unfortunately, each of the cascade multipliers 20A, 20B requires a circuit coupled to the positive terminal of each of the pump capacitors C1-C3 and a circuit coupled to the negative terminal of each of the pump capacitors C1-C3 to reconfigure the network. The additionally circuitry either decreases the efficiency of the cascade multipliers 20A, 20B and/or requires large bypass transistors. Furthermore, the pump capacitors C1-C3 that are bypassed get charged to a voltage that is equal to the input voltage VI minus a diode voltage drop. For example, when the first enable signal EN1 is high the positive terminal of the pump capacitor C1 is biased to a voltage that is one diode drop below the input voltage VI while the negative terminal of the pump capacitor C1 is biased to ground. When the number of capacitors in the charge transfer path changes, the total amount of charge prior to a reconfiguration event equals the total amount of charge after the reconfiguration event due to charge conservation. This means that the charge in each capacitor prior to the reconfiguration event redistributes among the remaining capacitors upon the reconfiguration event. Furthermore, the voltage across each capacitor before and after the reconfiguration event also changes proportionally to the conversion-gain and the input voltage VI. The polarity of each capacitor voltage change depends on whether the conversion-gain of the switched capacitor circuit is either increasing or decreasing.

A challenge with reconfigurable cascade multipliers lies in the design complexity of operating low-voltage transistors robustly with either a high input voltage range or a high output voltage range. Furthermore, current and/or voltage transients that occur upon each change in the conversion-gain can have significant impact in terms of input electromagnetic interference or transistor operation and robustness.

SUMMARY

In one aspect, the invention features an apparatus for converting a first voltage into a second voltage. Such an apparatus includes a reconfigurable switched capacitor power converter having a selectable conversion gain. This reconfigurable switched capacitor power converter includes a first cascade multiplier switched capacitor network having a plurality of capacitors, each of which is electrically connected, at a first terminal thereof, to a stack node associated with the capacitor and at a second terminal thereof to a phase node associated with the capacitor. This plurality of capacitors includes a first outer capacitor, a second outer capacitor, and at least one inner capacitor between the first outer capacitor and the second outer capacitor. A plurality of stack switches are between nodes of adjacent capacitors from a plurality of capacitors. A controller causes the first cascade multiplier switched capacitor network to transition between a first mode of operation and a second mode of operation. In the first mode of operation, at least one capacitor is isolated from a charge transfer path of the reconfigurable switched capacitor power converter, the charge transfer path extending between the first voltage and the second voltage. Consequently, in the first mode of operation, the reconfigurable switched capacitor power converter operates with a first conversion gain, in the second mode of operation, the reconfigurable switched capacitor power converter operates with a second conversion gain, and a third voltage across the at least one capacitor is free to assume any value.

In some embodiments, during operation, the third voltage is between the first voltage and the second voltage.

Among the embodiments of the apparatus are those that also include a pre-charge circuit. This pre-charge circuit is configured to charge the at least one capacitor to a specified voltage. In some embodiments, the at least one capacitor is an outer capacitor. However, in other embodiments, the at least one capacitor is an inner capacitor.

Also included among embodiments of the invention are those that include a switching network having switches for selectively bypassing the at least one capacitor.

In some embodiments, the first terminal is a positive terminal.

In embodiments, the controller is configured to isolate the at least one capacitor by disconnecting at most one terminal selected from the group consisting of the first terminal and the second terminal. Among these are embodiments that further include a set of stack switches disposed to permit disconnection of a subset of the capacitors from the charge transfer path, wherein the controller is configured to selectively open a subset of the stack switches so as to cause the subset of capacitors to be disconnected from the charge transfer path, thereby reconfiguring the charge transfer path.

Yet other embodiments include a set of phase switches disposed to permit disconnection of a subset of the capacitors from the charge transfer path, wherein the controller is configured to selectively open a subset of the phase switches so as to cause the subset of capacitors to be disconnected from the charge transfer path, thereby reconfiguring the charge transfer path.

Additional embodiments include those having a first external circuit for providing the first voltage and those having a second external circuit for receiving the second voltage.

In some embodiments, each capacitor in the plurality of capacitors is connected, at a second terminal thereof, to a corresponding one of a plurality of phase nodes. In others, at least two of the capacitors are connected to a common phase node.

Other embodiments also further include a second cascade multiplier switched capacitor network having a plurality of capacitors, each of which corresponds to a capacitor in the first cascade multiplier switched capacitor network, the result of which is that the first and second cascade multiplier switched capacitor networks are electrically parallel. Among these embodiments are those in which corresponding capacitors in the first and second cascade multiplier switched capacitor networks are connected to common nodes between cascoded stack switches.

Some embodiments include cascaded stack switches between adjacent capacitors. Among these are embodiments that include a voltage clamp for controlling voltage at a node between adjacent capacitors, and embodiments that include a voltage regulator for controlling voltage at a node between adjacent capacitors.

Additional embodiments include any combination of the foregoing features.

In another aspect, the invention features an apparatus for converting a first voltage into a second voltage. Such an apparatus includes a reconfigurable switched capacitor power converter having a selectable conversion gain. The reconfigurable switched capacitor power converter including a plurality of switch elements configured to electrically interconnect capacitors to one another and/or to the first or second voltage in successive states. These switch elements are configured to interconnect at least some capacitors to one another through the switch elements. The apparatus also includes a controller for causing the reconfigurable switched capacitor power converter to transition between a first mode of operation and a second mode of operation. The controller is configured to minimize electrical transients arising from transition from the first mode to the second mode. As a result, in the first mode of operation, the reconfigurable switched capacitor power converter operates with a first conversion gain and in the second mode of operation, the reconfigurable switched capacitor power converter operates with a second conversion gain.

In some embodiments, the controller is configured to minimize electrical transients during a transition period following a transition from the first mode to the second mode by raising a switching frequency of the reconfigurable switched capacitor power converter during the transition period. Among these are embodiments that include a pre-charged bypass capacitor, with the controller being configured to switch in the pre-charged bypass capacitor. Also among these embodiments are those in which the controller is configured to suppress input current using a bidirectional current limiter, as well as those in which the controller is configured to suppress input current by modulating an on-resistance.

In yet other embodiments, the controller is configured to minimize electrical transients by, during a transition period following cessation of operation in the first mode and prior to commencement of operation in the second mode, slewing voltages across at least one of the capacitors toward values that the capacitors would reach during the second mode. Among these are those embodiments in which the controller is configured to slew the voltages using a voltage regulator, those in which the controller is configured to slew the voltages using a current regulator, and those in which the controller is configured to slew the voltages using an output current.

In other embodiments, the controller is configured to minimize electrical transients by, during a transition period following cessation of operation in the first mode and prior to commencement of operation in the second mode.

Other embodiments include combinations of the foregoing features.

In another aspect, the invention features an apparatus for converting a first voltage into a second voltage. Such an apparatus includes a reconfigurable switched capacitor power converter having a selectable conversion gain. This reconfigurable switched capacitor power converter includes a plurality of switch elements configured to electrically interconnect capacitors to one another and/or to the first or second voltage in successive states. The switch elements are configured to interconnect at least some capacitors to one another through the switch elements. The apparatus also includes a controller for causing the reconfigurable switched capacitor power converter to transition between a first mode of operation and a second mode of operation. This controller is configured to minimize electrical transients during a transition period following a transition from the first mode to the second mode, whereby in the first mode of operation The reconfigurable switched capacitor power converter operates with a first conversion gain and with a second conversion gain in the second mode of operation. In this aspect of the invention, the controller is configured to either minimize electrical transients during a transition period following a transition from the first mode to the second mode by raising a switching frequency of the reconfigurable switched capacitor power converter during the transition period, to switch in a pre-charged bypass capacitor, or to suppress input current using one of a bidirectional current limiter and a modulated on-resistance.

DETAILED DESCRIPTION

Before describing several exemplary embodiments of cascade multipliers, it should be appreciated that in an effort to promote clarity in explaining the concepts, references are sometimes made herein to specific cascade multipliers or switched capacitors circuits. It should be understood that such references are merely exemplary and should not be construed as limiting. After reading the description provided herein, one of ordinary skill in the art will understand how to apply the concepts described herein to specific cascade multipliers and switched capacitor circuits.

It should be appreciated that reference is also sometimes made herein to particular input voltages and output voltages as well as to particular conversion-gain. It should be understood that such references are merely exemplary and should not be construed as limiting.

Reference may also sometimes be made herein to particular applications. Such references are intended merely as exemplary and should not be taken as limiting the concepts described herein to the particular application.

Thus, although the description provided herein explains the inventive concepts in the context of particular circuits or a particular application or a particular voltage, those of ordinary skill in the art will appreciate that the concepts equally apply to other circuits or applications or voltages.

The apparatus described herein provides a way to change the conversion-gain during operation for switched capacitor power converters in a way that minimizes current and/or voltage transients at the converter nodes. This is necessary for high conversion-gain switched capacitor power converters that support a wide input and/or output voltage range, and use low-voltage transistors in the converter. The apparatus allows the change in conversion-gain to involve different switched capacitor stages and combinations of stages, for flexibility and ease of implementation. Furthermore, it should be appreciated that the methods proposed in this disclosure can be applied to step-up configurations as well.

Figure 1A:
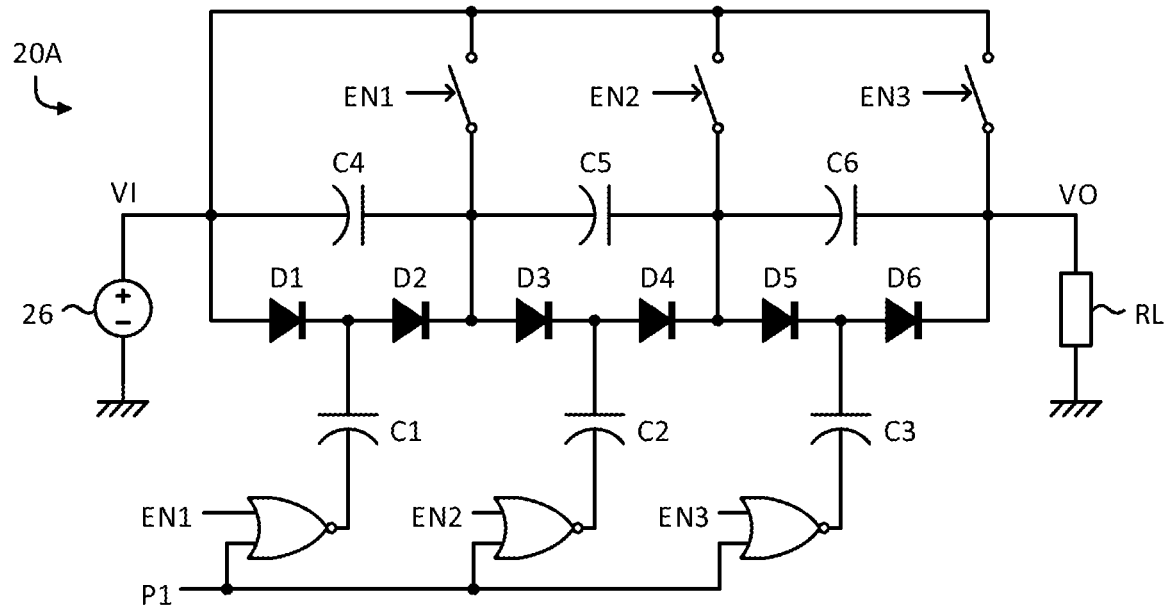
FIGS. 1A-1B show known reconfigurable switched capacitor circuits.
Figure 1B:
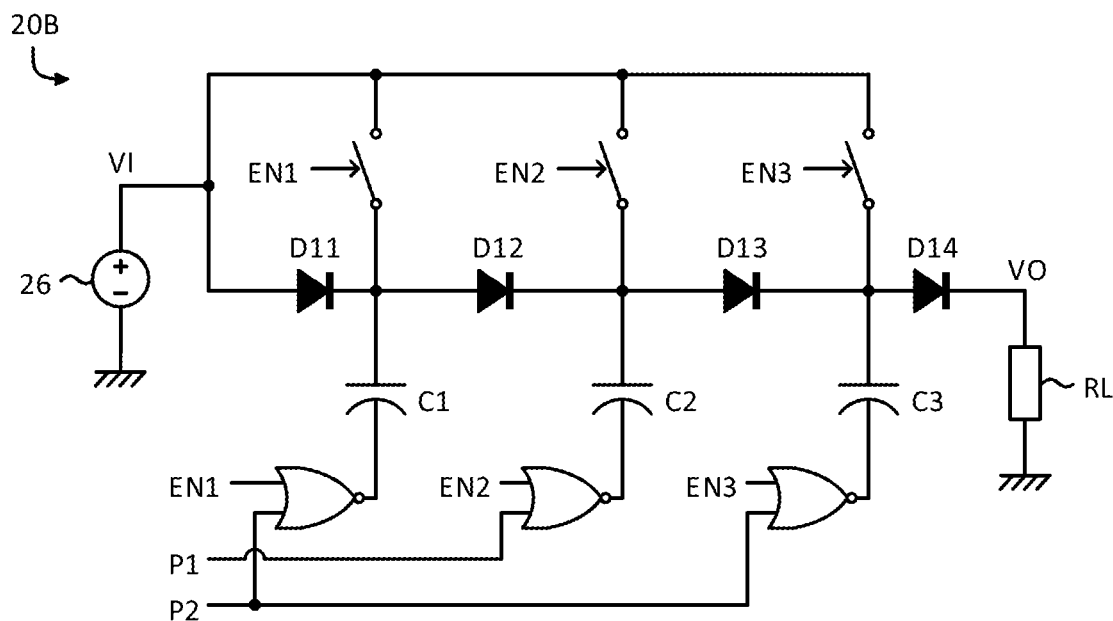
Figure 2:
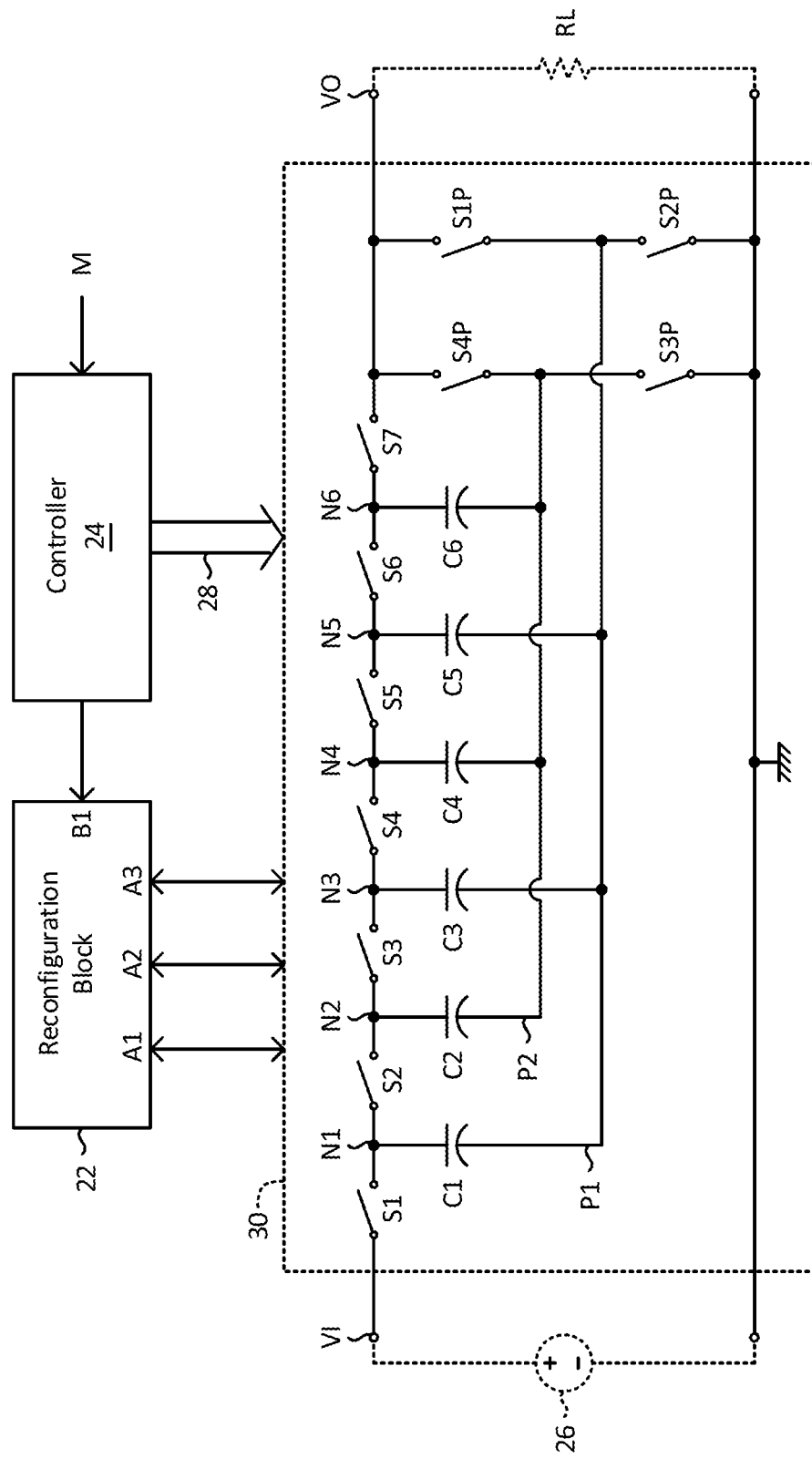
FIG. 2 shows a reconfiguration block coupled with a single-phase cascade multiplier having shared phase nodes.

FIG. 2 illustrates a cascade multiplier 30 that receives an input voltage VI from a source 26 and delivers an output voltage VO to a load RL. Since the source 26 and the load RL are not part of the cascade multiplier 30, they are shown in phantom. The cascade multiplier 30 is a single-phase symmetric cascade multiplier and includes capacitors C1-C6, stack switches S1-S7, and phase switches S1P-S4P. There are six stages within the cascade multiplier 30, wherein each stages includes a capacitor and a switch. The first stage includes the stack switch S1 and the capacitor C1; the second stage includes the stack switch S2 and the capacitor C2; and so on. The stack switch S7 is not associated with a capacitor. In this embodiment, The maximum conversion-gain is seven because there are six stages.

In the cascade multiplier 30, the phase switches SP1-SP4 generate the voltages at first and second phase nodes P1, P2. The first phase node P1 couples with the negative terminals of the capacitors C1, C3, C5 while the second phase node P2 couples with the negative terminals of the capacitors C2, C4, C6. The first and second phase nodes P1, P2 are shared by alternating capacitors. As used herein, the capacitors closest to the input voltage VI and the output voltage VO will be referred to as outer capacitors while the remaining capacitors will be referred to as inner capacitors. Consequently, in the cascade multiplier 30, capacitors C1, C6 are outer capacitors while capacitors C2-C5 are inner capacitors.

A controller 24 receives a conversion-gain signal M and provides control signals to the cascade multiplier 30 on path 28. The control signals activate and de-activate the stack switches S1-S7 and the phase switches SP1-SP4 in a specific sequence, such that the cascade multiplier 30 features two states of operation repeated at a specific frequency. For example, during a first state or state one, the odd stack switches S1, S3, S5, S7 and the odd phase switches S1P, S3P are closed while the even stack switches S2, S4, S6 and the even phase switches S2P, S4P are open. In contrast, during a second state or state two, the odd stack switches S1, S3, S5, S7 and the odd phase switches SIP, S3P are open while the even stack switches S2, S4, S6 and the even phase switches S2P, S4P are closed. As a result, the cascade multiplier 30 generates an output voltage VO that is seven times lower than the input voltage VI. To change the conversion gain, a reconfiguration block 22 in concert with the controller 24 alters the connections between the capacitors C1-C6 in the first and second state via terminals A1-A3. Furthermore, the controller 24 controls the switches within the reconfiguration block 22 via terminal B1.

In general, decreasing the conversion-gain necessitates the removal of at least one of the stages and by extension, the removal of at least one of the capacitors C1-C6. In contrast, increasing the conversion-gain necessitates the addition of at least one stage and by extension, the addition of at least one of the capacitors C1-C6. Unfortunately, in the cascade multiplier 30, it is not possible to completely remove or isolate any of the capacitors C1-C6 because they share either the first phase node P1 or the second phase node P2. However, any or all of the capacitors C1-C6 can be removed from the charge transfer path by disconnecting its current flow path. For example, by opening the stack switches S1, S2, the capacitor C1 is removed from the charge transfer path. Given the series-connected nature of the stack switches S1-S7, the charge transfer path is broken by simply disabling the stack switches S1, S2. Therefore, the reconfiguration block 22 contains switches that form a bypass path around the isolated capacitor C1 while maintaining the proper charge transfer path.

To increase the conversion-gain, a previously removed capacitor (e.g. C1) can be added back into the charge transfer path. To accomplish this, the pair of stack switches (e.g. S1, S2) at the positive terminal of the previously removed capacitor (e.g. C1) are re-enabled while the corresponding bypass switch is disabled. In general, the number of bypass switches and connections between the cascade multiplier 30 and the reconfiguration block 22 depends on the range of the conversion-gains.

Table 1 summarizes three possible configuration of connections between the various cascade multiplier 30 nodes and the terminals A1, A2, A3 of the reconfiguration block 22 that support the conversion-gains of five, six, and seven. More configurations consisting of a combination or variation of the three shown in Table 1 are possible at the expense of more terminals, connections, and complexity. For example, the first approach and the second approach can be used at the same time or in an alternating fashion.

TABLE 1

| Reconfiguration block terminal | First Approach | Second Approach | Third Approach |
|---|---|---|---|
| A1 | VO | V1 | N5 |
| A2 | N5 | N2 | N2 |
| A3 | N4 | N3 | not connected |

In a first reconfiguration approach, the capacitors C1-C6 starting from the last stage are added or removed (e.g. C5). In a second reconfiguration approach, the capacitors C1-C6 starting from the first stage are added or removed (e.g. C1). Lastly, in a third reconfiguration approach, the capacitors C1-C6 starting from an inner stage are added or removed (e.g. C3 and/or C4). In Table 1, for the third reconfiguration approach, the capacitors C3, C4 happen to be in adjacent stages. This property is not a requirement, but does have the advantage of reducing the number of bypass switches needed to remove an even-integer number of capacitors.

Figure 3A:
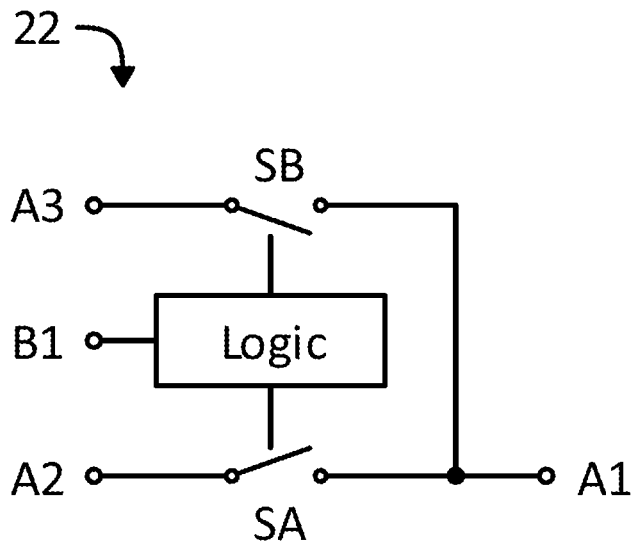
FIG. 3A shows a particular implementation of the reconfiguration block in FIG. 2.

FIG. 3A shows a particular implementation of the reconfiguration block 22 containing two bypass switches SA, SB with a common connection at terminal A1 and separate connections at terminals A2, A3, respectively. The switches in the reconfiguration block 22 and the stack switches S1-S7 connected to the reconfiguration block 22 should have the ability to be open or close regardless of the voltage polarity and magnitude across the switch terminals. This rules out the use of standard diodes as switches, and instead, requires the use of relays or transistors.

Table 2 shows the states of operation for all of the top switches S1-S7 and the bypass switches SA, SB in FIGS. 2-3A, for the three different reconfiguration approaches where M is equal to the conversion-gain. For example, in state one, the switches designated "A" are closed while the switches designated "B" are open. In state two, the switches designated "A" are open while the switches designated "B" are closed. The switches designated "O" stay open in both states of operation. Table 2 illustrates the following example: at a conversion-gain of six, the 5 capacitor C6 is removed in the first approach while the capacitor C1 is removed in the second approach. At a conversion-gain of five, the capacitors C5-C6 are removed in the first approach, while the capacitors C1-C2 are removed in the second approach. In the third approach at a conversion-gain of five, the capacitors C3-C4 are removed.

TABLE 2

| | First Approach | | | Second Approach | | Third Approach |
|---|---|---|---|---|---|---|
| Switch | M = 7 | M = 6 | M = 5 | M = 6 | M = 5 | M = 5 |
| S1 | A | A | A | O | O | A |
| S2 | B | B | B | O | O | B |
| S3 | A | A | A | A | O | O |
| S4 | B | B | B | B | B | O |
| S5 | A | A | O | A | A | O |
| S6 | B | O | O | B | B | B |
| S7 | A | O | O | A | A | A |
| SA | O | B | O | B | O | A |
| SB | O | O | A | O | A | O |

Using transistors as switches introduces additional considerations, such as the transistor's drain-to-source voltage rating and its back-gate voltage bias. In the cascade multiplier 30, the phase switches S1P-S4P see a maximum drain-to-source voltage equal to the output voltage VO when open. In contrast, the stack switches S1-S7 see a maximum drain-to-source voltage equal to two times the output voltage VO when open.

As for the bypass switches SA, SB, in the first and second reconfiguration approaches, they see a maximum drain-to-source voltage equal to two times the output voltage VO and three times the output voltage VO, respectively when open. However, in the third configuration, the bypass switches SA, SB see a maximum drain-to-source voltage that is highly dependent upon which of the capacitors C1-C6 are removed.

For example, in the third approach, as illustrated in Table 2, the bypass switch SA is connected across nodes N2, N5. The bypass switch SA is thereby exposed to a maximum drain-to-source voltage equal to four times the output voltage VO when the conversion-gain is seven. In other words, the transistors that implement the bypass switches SA, SB should have a higher drain-to-source voltage rating than those that implement the phase switches SIP-S4P and stack switches S1-S7.

Figure 3B:
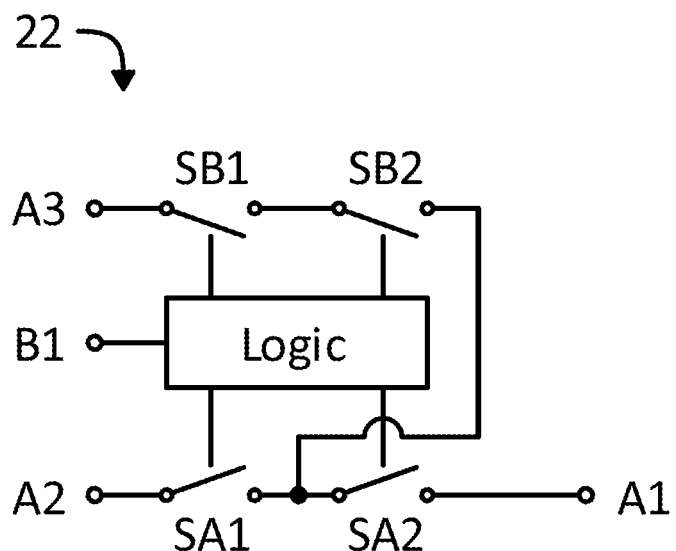
FIG. 3B shows a particular implementation of the reconfiguration block in FIG. 2 using cascoded switches.

FIG. 3B shows an alternate implementation of the reconfiguration block 22, wherein each bypass switch (e.g. SA) consists of two cascoded transistors (e.g. SA1, SA2), essentially halving the maximum drain-to-source voltage seen by each transistor. The tradeoff is higher complexity and lower efficiency given the larger number of transistors. Another consideration is the transistor back-gate voltage in relation to the drain or source voltage.

The common-mode voltage of the stack switches S1-S7 is an increasing integer multiple of the output voltage VO as you move from the stack switch S7 to the stack switch S1. Biasing the back-gate voltage of each of the stack switches S1-S7 to their corresponding source voltage reduces their size for a given on-resistance, compared to biasing the back-gate voltage to ground (for NMOS transistors) or the input voltage VI (for PMOS transistors). The latter biasing scheme can result in a significant back-gate effect on the transistor threshold voltage that reduces the effective on-resistance for a given transistor size and gate-drive voltage level. However if die area or efficiency is not a significant concern, this biasing scheme is less complex than a scheme that tries to minimize or eliminate the back-gate effect.

When the conversion-gain is reduced some of the stack switches (e.g. S6, S7 in the first approach) are open in both states of operation according to Table 2. The voltage polarity across these opened stack switches (e.g. S6, S7 in the first approach) will reverse and cause the transistor body diode to conduct unless the back-gate connection is switched to the lower of the drain and source voltages. This is true regardless of whether the capacitors (e.g. C6) removed during the reconfiguration maintain their voltage or discharge over time due to leakage. Having the transistor body diode conduct when a switch is supposed to be open inevitably results in misbehavior.

For example, assuming the cascade multiplier 30 reconfigures from a conversion-gain of seven to six using the first reconfiguration approach and the stack switches S1-S7 are implemented using NMOS transistors. The stack switch S6 should move its back-gate connection from the node N6 to the node N5 during state two while the capacitor C6 maintains its previous voltage equal to the output voltage VO. If the capacitor C6 slowly discharges to zero volts over time, then the stack switch S6 should keep its back-gate connected to the node N6 while the stack switch S7 should move its back-gate connection from the output voltage VO to the node N6.

Implementing the third reconfiguration approach for the cascade multiplier 30 can be quite complex when the conversion-gain changes by an odd-numbered integer. This is because the negative terminal of each of the capacitors C1-C6 is always connected to a shared phase node, and in a symmetric cascade multiplier, capacitors from adjacent stages operate in opposite phases or couple with opposite phase nodes. Removing an inner capacitor to reduce the conversion-gain by one, results in adjacent-stage capacitors that share the same phase node. Although this can be resolved by flipping the stage order of the remaining capacitors, the result is a higher switch control and transistor back-gate-switching complexity as well as higher voltage bypass switches.

For example, if the conversion-gain changes from seven to six by removing the capacitor C4, the topology of the cascade multiplier 30 can be maintained by making numerous changes. Suitable changes to the cascade multiplier 30 are as follows: (1) opening the stack switches S4, S5, S7; (2) flipping the designation of the stack switch S6 from "B" to "A"; (3) connecting a first bypass switch between the node N5 and the output voltage VO; (4) connecting a second bypass switch between the nodes N3, N6; and (5) assigning the first and second bypass switches a "B" designation. In contrast, changing the conversion-gain in even-integer increments is much easier to implement because removing adjacent-stage inner capacitors in pairs preserves the topology.

Figure 4:
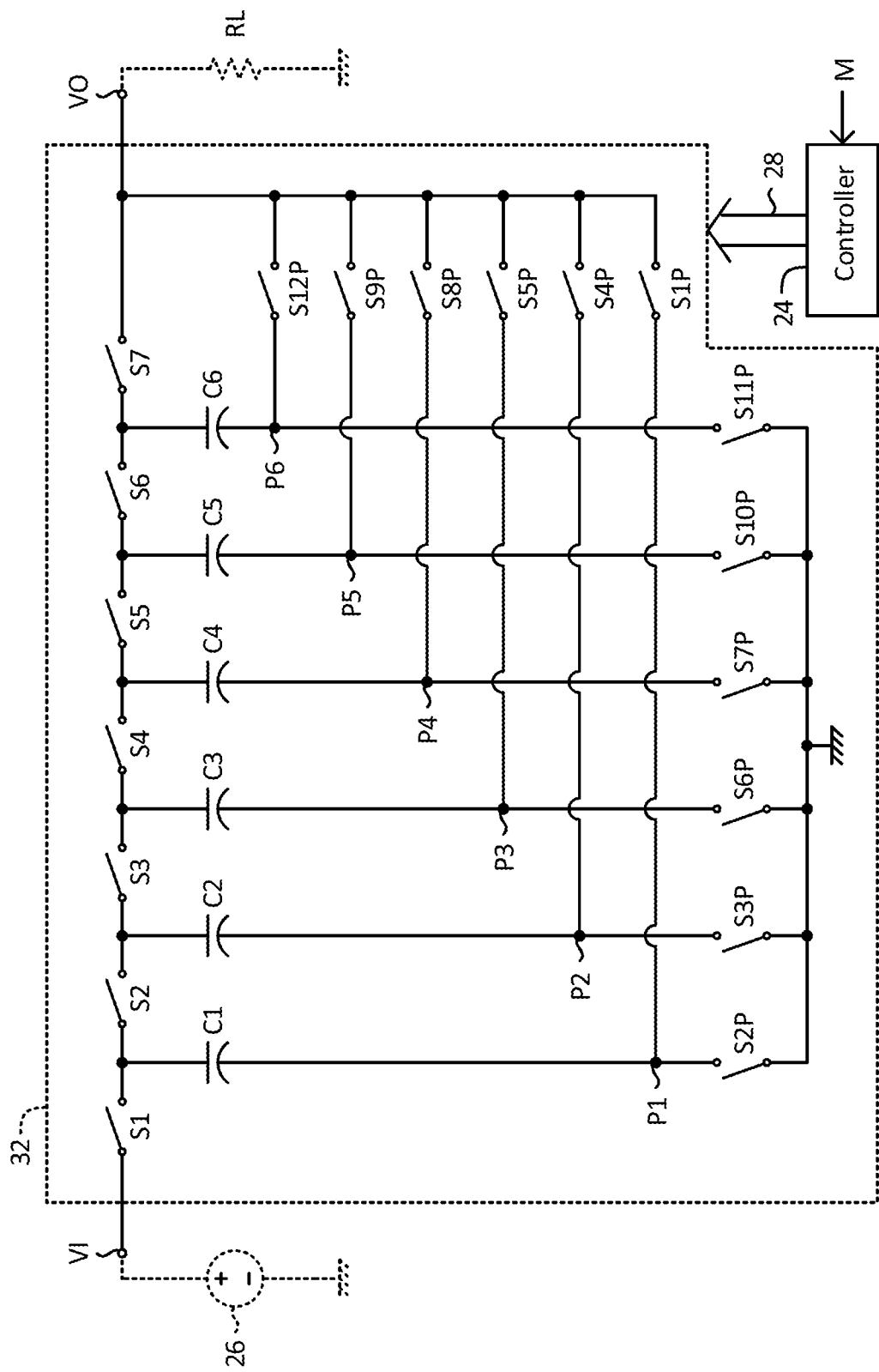
FIG. 4 shows a single-phase cascade multiplier having separated phase nodes.

FIG. 4 shows a cascade multiplier 32 that is variation of the cascade multiplier 30. Consequently, the cascade multiplier 32 is a single-phase symmetric cascade multiplier that includes capacitors C1-C6 and stack switches S1-S7. However, unlike in the cascade multiplier 30, separate phase nodes P1-P6 connect to the negative terminal of the corresponding capacitors C1-C6.

A controller 24 receives a conversion-gain signal M and provides control signals to the cascade multiplier 32 on path 28. The control signals activate and de-activate the stack switches S1-S7 and the phase switches SP1-SP12 in a specific sequence, such that the cascade multiplier 32 features two states of operated repeated at a specific frequency. During a first state or state one, the odd stack switches S1, S3, S5, S7 and the odd phase switches S1P . . . S11P are closed while the even stack switches S2, S4, S6 and the even phase switches S2P . . . S12P are open. In contrast, during a second state or state two, the odd stack switches S1, S3, S5, S7 and the odd phase switches S1P . . . S11P are open while the even stack switches S2, S4, S6 and the even phase switches S2P . . . S12P are closed. As a result, the cascade multiplier 32 generates an output voltage VO that is seven times lower than the input voltage VI.

Because the phase nodes P1-P6 are separated, the controller 24 can reconfigure the cascade multiplier 32 and hence change the conversion-gain by modify the control signals on the path 28. Table 3 shows the states of operation for the stack switches S1-S7 and the phase switches S1P-S12P in the cascade multiplier 32 for three different reconfiguration approaches. As with Table 2, the following example is illustrated by Table 3: at a conversion-gain of six, the capacitor C6 is removed in the first approach, the capacitor C1 is removed in the second approach, and the capacitor C4 is removed in the third approach. At a conversion-gain of five, the capacitors C5, C6 are removed in the first approach, the capacitors C1, C2 are removed in the second approach, and the capacitors C3, C4 are removed in the third approach.

TABLE 3

| Switches | First Approach | | | Second Approach | | Third Approach | |
|---|---|---|---|---|---|---|---|
| | M = 7 | M = 6 | M = 5 | M = 6 | M = 5 | M = 6 | M = 5 |
| S1 | A | A | A | B* | A | A | A |
| S2 | B | B | B | B | A* | B | B |
| S3 | A | A | A | A | O | A | A |
| S4 | B | B | B | B | B | B | A* |
| S5 | A | A | A | A | A | B* | A |
| S6 | B | B | A* | B | B | A* | B |
| S7 | A | B* | A | A | A | B* | A |
| S1P/S2P | A/B | A/B | A/B | O/O | O/O | A/B | A/B |
| S3P/S4P | A/B | A/B | A/B | A/B | O/O | A/B | A/B |
| S5P/S6P | A/B | A/B | A/B | A/B | A/B | A/B | O/O |

TABLE 3-continued

| | First Approach | | | Second Approach | | Third Approach | |
|---|---|---|---|---|---|---|---|
| Switches | M = 7 | M = 6 | M = 5 | M = 6 | M = 5 | M = 6 | M = 5 |
| S7P/S8P | A/B | A/B | A/B | A/B | A/B | O/O | O/O |
| S9P/S10P | A/B | A/B | O/O | A/B | A/B | B/A* | A/B |
| S11P/S12P | A/B | O/O | O/O | A/B | A/B | B/A* | A/B |

The main advantage of not sharing the phase nodes P1-P6 between the capacitors C1-C6, is that a separate reconfiguration block 22 including high-voltage bypass switches is no longer necessary, as was the case in FIG. 2. The negative terminals of the removed capacitors are disconnected instead of the positive terminal as in the cascade multiplier 30. The phase switches SP1-SP12 serve as a means to disconnect the capacitors while the stack switches S1-S7 provide a bypass path.

In state one, the switches designated "A" are closed while the switches designated "B" are open. In state two, the switches designated "A" are open while the switches designated "B" are closed. The switches designated "O" stay open in both states of operation. The entries designated with an asterisk "*" indicate a state polarity reversal from when the conversion-gain is seven.

For example, when the capacitors C1, C2 are removed, the conversion-gain is equal to five (second reconfiguration approach). The phase switches S1P-S4P stay open in both states of operation while the stack switches S1, S2 follow the same state as the stack switch S3. This means that during state one, the positive terminal of the capacitor C3 is shorted to the input voltage VI through the three series-connected switches S1-S3 while the same set of stack switches S1-S3 are open during state two. As this example illustrates, repurposing the stack switches S1, S2 can result in a higher conduction loss than using a separate bypass switch. In addition, the first and second reconfiguration approaches allow removed capacitors to be reused easily as bypass capacitors between the output voltage VO or the input voltage VI to ground. For example, in the first reconfiguration approach, when the conversion-gain is equal to five, the capacitors C5, C6 can serve as extra bypass capacitors between the output voltage VO and ground. This is done without interfering with normal operation of the cascade multiplier 32 by closing the switches S6, S7, S10P, S11P and opening the switches S9P, S12P in both states (i.e. state one and state two). A free side benefit of this approach, is the capacitors C5, C6 are pre-charged to a known voltage without additional circuitry.

Similarly, in the second approach, when the conversion-gain is equal to five, the capacitors C1, C2 can serve as extra bypass capacitors between the input voltage VI and ground. This is also done without interfering with normal operation of the cascade multiplier 32 by closing the switches S1, S2, S2P, S3P and opening the switches S1P, S4P in both state one and state two. Although the lack of a pre-charge circuit requirement is attractive, there is a downside to having the capacitors C1, C2 biased above what their steady-state voltage levels would be when reconnected to the cascade multiplier 32 upon an increase in the conversion-gain. When the reconfiguration takes place, there can be larger current and voltage transients at the nodes of the cascade multiplier 32.

Another benefit of separating the phase nodes P1-P6 is that the body diodes of the stack switches S1-S7 are no longer susceptible to turning on when there is at least one of the capacitor C1-C6 is removed from the cascade multiplier 32. This is because the positive terminals of each of the capacitors C1-C6 are always biased to the correct relative voltage levels and polarity from one state to the next. There is an underlying assumption that the conversion-gain is not changed more than one step at a time and there is enough settling time to allow all of the remaining capacitors in the charge transfer path to reach their new steady-state voltages before the next reconfiguration step. This prevents the phase nodes at the removed capacitors from being driven below ground and stressing the corresponding phase switches, though this issue can be overcome by switching the back-gate of the phase switches accordingly.

The separated phase nodes P1-P6 also allows for a simpler implementation of the third reconfiguration approach that can handle odd-numbered integer changes in the conversion-gain since the capacitor stage order does not have to be flipped to preserve proper operation. Furthermore, once a particular reconfiguration approach has been selected, only the capacitors that are to be removed or added according to that approach need separate phase nodes while the remaining capacitors can share their phase nodes, thereby resulting in pin savings especially if all capacitors are external to the package of the switched capacitor power converter.

In the event that the removed capacitors discharge their voltage over multiple switching cycles towards zero, both the positive and negative terminals of the removed capacitors are biased near integer multiples of the output voltage VO. When this event occurs, the voltage stresses at the phase nodes P1-P6 can be quite large. The magnitude of the voltage stress depends upon the reconfiguration approach. In the case of the first reconfiguration approach, the maximum phase node voltage remains equal to the output voltage VO even after the removed capacitor has fully discharged. However, this is not the case for the second and third reconfiguration approaches.

In the second reconfiguration approach, if the capacitor C1 is both removed and discharged, the voltage at the first phase node P1 would be close to the input voltage VI. The phase switch S1P will then be exposed to a maximum drain-to-source voltage equal to five-sixths of the input voltage VI while the phase switch S2P is exposed to a maximum drain-to-source voltage equal the input voltage VI. Therefore, the transistors implementing the phase switches S1P, S2P should have a higher drain-to-source voltage rating than those implementing the stack switches S1-S7. Additionally, to prevent the body-diode of the phase switch S1P (e.g. NMOS) from conducting, its back-gate should be switched from the first phase node P1 to the output voltage VO.

A similar problem applies to the third reconfiguration approach wherein, either the capacitor C3 or the capacitor C4 is both removed and discharged. Fortunately, the open phase switches (e.g. S5P, S6P in C3 case) are exposed to voltage stresses that are smaller in magnitude when compared to the second reconfiguration approach.

One possible solution would be to keep the phase nodes of the removed capacitors biased at or near the output voltage VO using voltage regulators. To achieve this, the phase node voltages P1-P6 can be monitored over several switching cycles and a voltage regulator at each of the phase nodes P1-P6 can be enabled upon detection of a voltage deviation above the output voltage VO. The task of the voltage regulator is to maintain a voltage and can be implemented using circuits, such as linear regulators and voltage followers.

An alternative solution would be to use the previous proposal of reusing the removed capacitors as bypass capacitors between the input voltage VI and ground. However, this method is more suitable for the second reconfiguration approach. Both solutions provide a means of biasing the removed capacitors at a voltage other than zero volts.

Figure 5:
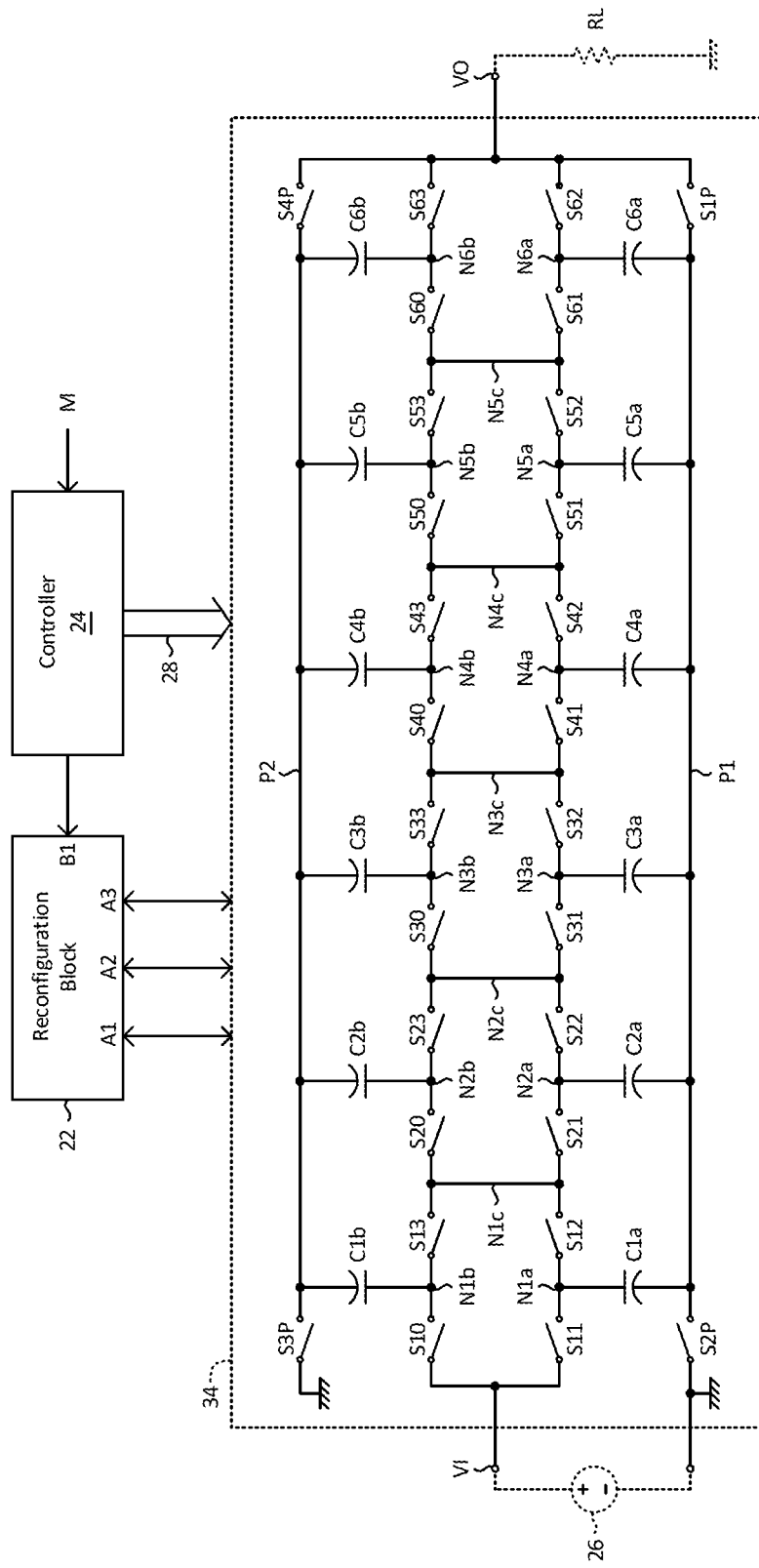
FIG. 5 shows a reconfiguration block coupled with a dual-phase cascade multiplier having shared phase nodes.

In general, a single-phase cascade multiplier can be converted into a multi-phase construction featuring multiple charge transfer paths that are shifted in time. As illustrated in FIG. 5, a dual-phase cascade multiplier circuit 34 can be constructed by placing two copies of the single-phase cascade multiplier circuit 30 in parallel.

The cascade multiplier 34 includes capacitors C1a-C6b, stack switches S10-S63, and phase switches SP1-SP4. Generally, there should be twice as many stack switches in a dual-phase construction, however, the stack switches S10-S63 in the cascade multiplier 34 are cascaded as well. Due to the cascading, the maximum drain-to-source voltage seen by each of the stack switches S10-S63 is equal to the output voltage VO. The stack switches S10-S63 and the phase switches SP1-SP4 can now be implemented using the same transistors.

Additionally, the cascade multiplier 34 requires twice as many capacitors compare to the cascade multiplier 30. A first phase node P1 couples with the negative terminals of the capacitors C1a-C6a while a second phase node P2 couples with the negative terminals of capacitors C1b-C6b. The phase switches SP1-SP4 generate the voltages at the first and second phase nodes P1, P2. In the cascade multiplier 34, the capacitors C1a, C1b, C6a, C6b are outer capacitors, while the remaining capacitors are inner capacitors.

A controller 24 receives a conversion-gain signal M and provides control signals to the cascade multiplier 34 on path 28. The control signals activate and de-activate the stack switches S10-S62 and the phase switches SP1-SP4 in a specific sequence, such that the cascade multiplier 34 features two states of operated repeated at a specific frequency. For example, during state one, the odd stack switches S11, S13 . . . . S61, S63 and odd phase switches S1P, S3P are closed while the even stack switches S10, S12 . . . . S60, S62 and the even phase switches S2P, S4P are open. In contrast, during state two, the odd stack switches S11, S13 . . . . S61, S63 and odd phase switches S1P, S3P are open while the even stack switches S10, S12 . . . . S60, S62 and the even phase switches S2P, S4P are closed. As a result, the cascade multiplier 34 generates an output voltage VO that is seven times lower than the input voltage VI. To change the conversion-gain, a reconfiguration block 22 in concert with the controller 24 alters the connections between the capacitors C1a-C6b in the first and second state via terminals A1-A3. The controller 24 control the configuration of the reconfiguration block 22 via terminal B1.

The reconfiguration block 22 includes bypass switches SA, SB as in FIG. 3A or cascaded bypass switches SA1-SB2 as in FIG. 3B. Table 4 summarizes three possible connection configurations between the various cascade multiplier 34 nodes and terminals A1, A2, A3 of the reconfiguration block 22. The supported conversion-gains are five, six, and seven. More connection configurations including a combination or variation of the three shown in Table 4 are possible at the expense of more terminals, connections, and complexity.

TABLE 4

| Reconfiguration block terminal | First Approach | Second Approach | Third Approach |
| --- | --- | --- | --- |
| A1 | VO | V1 | N4c |
| A2 | N5c | N1c | N3c |
| A3 | N4c | N2c | N2c |

In a first reconfiguration approach, starting from the last stage, some of the capacitors C1a-C6b are added or removed (e.g. C5a, C5b, C6a, C6b). In a second reconfiguration approach, starting from the first stage, some of the capacitors C1a-C6b are added or removed (e.g. C1a, C1b, C2a, C2b). Lastly, in a third reconfiguration approach, starting from an inner stage, some of the capacitors C1a-C6b are added or removed (e.g. C3a, C3b, C4a, C4b). In Table 4, for the third reconfiguration approach, the capacitors C3a, C3b, C4a, C4b happen to be in adjacent stages. This property is not a requirement, but does have the advantage of reducing the number of bypass switches used to remove an even-integer number of capacitors.

One advantage of a dual-phase construction over a single-phase construction is that when the bypass switches SA, SB are open, they experience a lower maximum drain-to-source voltage that is equal to the output voltage VO and two times the output voltage VO, respectively.

Table 5 shows the states of operation for the stack switches S10-S63 and bypass switches SA, SB for the three reconfiguration approaches. The switches designated "O" stay open in both states of operation, the switches designated "C" stay closed in both states of operation, and the switches designated "N" follow the same operation in each of the two states as when the conversion-gain signal M is equal to seven.

When used, the bypass switch is closed in both states. If the conversion-gain signal M is equal to five, the bypass switch SA is designated as "O+" since it either can remain open or closed in both states. However, by synchronized the bypass switch SA with the bypass switch SB, the maximum drain-to-source voltage across the open stack switches is minimized.

TABLE 5

| | First Approach | | Second Approach | | Third Approach | |
| --- | --- | --- | --- | --- | --- | --- |
| Switches | M = 6 | M = 5 | M = 6 | M = 5 | M = 6 | M = 5 |
| S10-S13 | N | N | O | O | N | N |
| S20-S23 | N | N | N | O | N | N |
| S30-S33 | N | N | N | N | N | O |
| S40-S43 | N | N | N | N | O | O |
| S50-S53 | N | O | N | N | N | N |
| S60-S63 | O | O | N | N | N | N |
| SA | C | O+ | C | O+ | C | O+ |
| SB | O | C | O | C | O | C |

From Table 5, it is also apparent the dual-phase cascade multiplier 34 can support odd-integer changes in the conversion-gain with the third reconfiguration approach without the complexity associated with a single-phase cascade multiplier. For instance, the capacitors C1a-C6a include six stages in parallel that share the first phase node P1 while the capacitors C1b-C6b include six stages in parallel that share the second phase node P2. This is different for the single-phase cascade multiplier, wherein each of the six stages connects to the first and second phase nodes P1, P2 in an alternating fashion.

In normal operation, it is possible for the voltage polarity across some of the stack switches S10-S63 to reverse in at least one state of operation when at least one of the capacitors C1a-C6b is removed. As in the single-phase cascade multiplier 30, back-gate voltage switching of the stack switches can be employed in the dual-phase cascade multiplier 34 to prevent undesired body diode conduction. Alternatively, at the expense of die area and power loss, the back-gate of the stack switches S10-S63 can be biased to ground (for NMOS transistors) or the input voltage VI (for PMOS transistors) whenever at least one of the capacitors C1a-C6b is removed.

Figure 6:
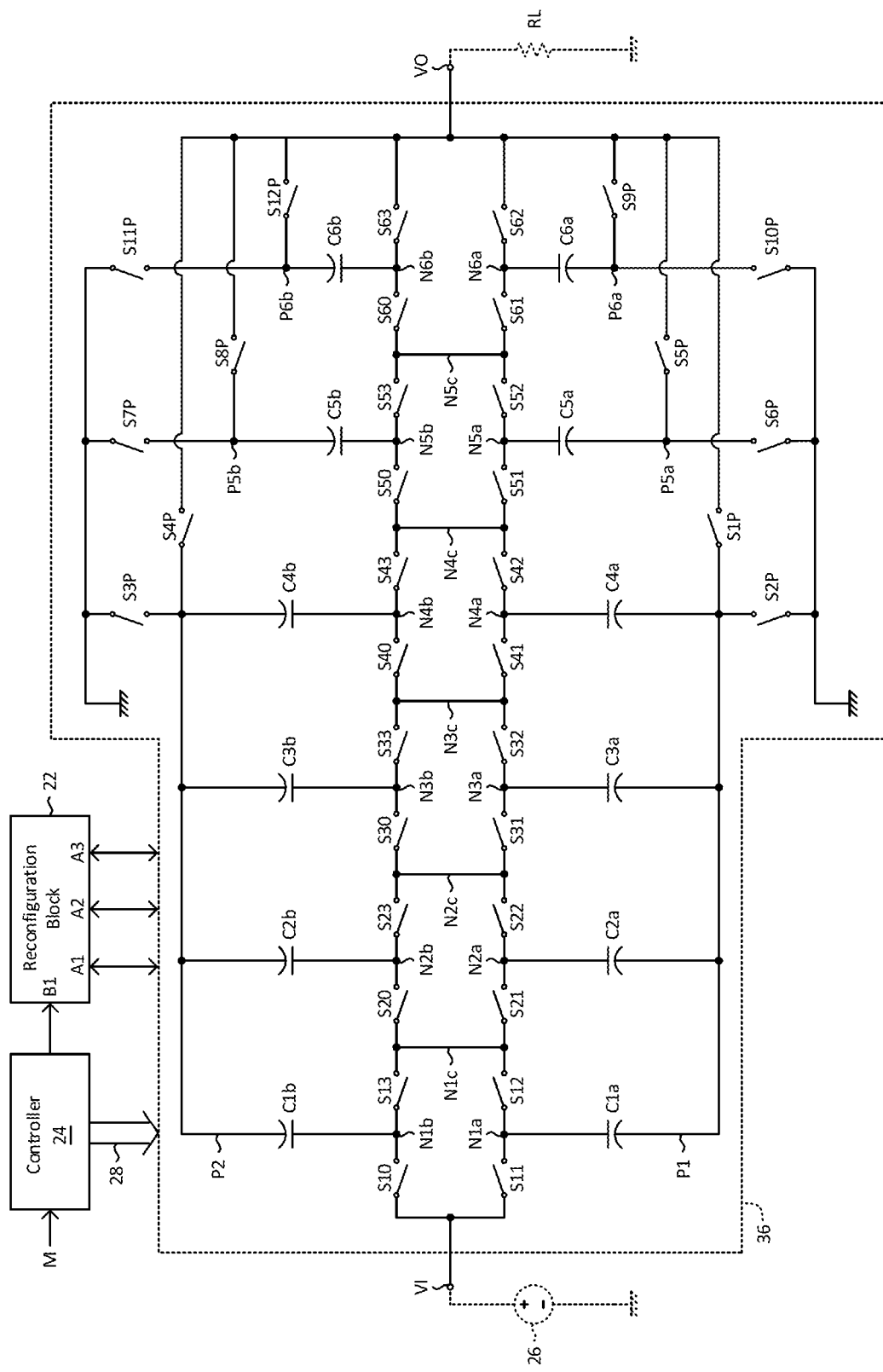
FIG. 6 shows a dual-phase cascade multiplier having separated phase nodes.

FIG. 6 shows a variation of the cascade multiplier 34 where capacitors C5a, C5b, C6a, C6b are coupled with separate phase nodes P5a, P5b, P6a, P6b, while the remaining capacitors C1a-C4a share phase node P1 and C1b-C4b share phase node P2.

Since the dual-phase structure inherently results in a higher number of package pins than a single-phase with an equivalent conversion-gain when external capacitors are used, it becomes more pin efficient to have separate phase nodes only for the capacitors that are removed during a conversion-gain reconfiguration, while having the remaining capacitors share phase nodes.

FIG. 6 shows a dual-phase cascade multiplier 36 that utilizes both a reconfiguration block 22 and separates the phase nodes. Due to the similarity between the cascade multiplier 34, the cascade multiplier 36 operates as described in connection with FIG. 5. The only major difference being the addition of four extra phase nodes P5a-P6b. When the conversion-gain is equal to five, six, or seven, many of the properties associated with the cascade multiplier 32 hold true. For example, separated phase nodes removes the importance of back-gate switching at the transistor implementations of the stack switches. Furthermore, the previously discussed advantages of the first reconfiguration approach over the second and third reconfigurations approaches for the cascade multiplier 32 also apply here.

In general, changing a switched capacitor power converter's conversion-gain involves removing or adding capacitors to the charge transfer path. If this occurs in the middle of the converter operation, this disruptive event introduces large voltage and/or current transients at various the converter nodes, including the input voltage VI terminal and the output voltage VO terminal. The magnitude or severity of these voltage and/or current transients can be minimized using various methods. All of the proposed methods can be used separately or in various combinations thereof.

Referring to FIG. 5, Table 6 summarizes the average steady-state voltage across each of the cascade multiplier 36 capacitors C1a-C6b and the value of the output voltage VO, assuming the input voltage VI is equal to fourteen volts. Table 6 also illustrates the following example: at a conversion-gain of six, the capacitors C6a, C6b are removed in the first approach, the capacitors C1a, C1b are removed in the second approach, and the capacitors C4a, C4b are removed in the third approach. At a conversion-gain of five, the capacitors C5a, C6b are removed in the first approach, the capacitors C1a, C2b are removed in the second approach, and the capacitors C3a, C4b are removed in the third approach.

TABLE 6

| Voltages | M = 7 | First Approach | | Second Approach | | Third Approach | |
|---|---|---|---|---|---|---|---|
| | | M = 6 | M = 5 | M = 6 | M = 5 | M = 6 | M = 5 |
| C1a (V) C1b (V) | 12 | 11.67 | 11.2 | — | — | 11.67 | 11.2 |
| C2a (V) C2b (V) | 10 | 9.33 | 8.4 | 11.67 | — | 9.33 | 8.4 |
| C3a (V) C3b (V) | 8 | 7.00 | 5.6 | 9.33 | 11.2 | 7.00 | — |
| C4a (V) C4b (V) | 6 | 4.67 | 2.8 | 7.00 | 8.4 | — | — |
| C5a (V) C5b (V) | 4 | 2.33 | — | 4.67 | 5.6 | 4.67 | 5.6 |
| C6a (V) C6b (V) | 2 | — | — | 2.33 | 2.8 | 2.33 | 2.8 |
| VO (V) | 2 | 2.33 | 2.8 | 2.33 | 2.8 | 2.33 | 2.8 |

Each capacitor voltage is an integer multiple of the output voltage VO and the voltage difference between two capacitors from adjacent stages is equal to the output voltage VO. For example, if the conversion-gain equals seven then the first stage capacitors are the capacitors C1a, C1b with a voltage equal to six times the output voltage VO. The second stage capacitors are the capacitors C2a, C2b with a voltage equal to five times the output voltage VO. The third stage capacitors are the capacitors C3a, C3b with a voltage equal to four times the output voltage VO and so on.

The voltages across the capacitors C1a-C6b and the value of the output voltage VO changes when the conversion-gain of the cascade multiplier 34 changes. For example, assuming the first reconfiguration approach and the input voltage is left unchanged upon reconfiguration, if the conversion-gain changes from seven to five then the voltage across the capacitors C1a-C1b, C2a-C2b, C3a-C3b, C4a-C4b are now four times, three times, two times, and one times the output voltage VO, respectively. Furthermore, the voltage across each of the capacitors C1a-C4b decreases while the output voltage VO increases.

In the first reconfiguration approach, the voltage across the remaining capacitors C1a-C4a decreases when reducing the conversion-gain, resulting in a large current transient flowing from the cascade multiplier 34 towards the source 26 in a reverse polarity. In contrast, when using the second reconfiguration approach, the voltage across the remaining capacitors increases when reducing the conversion-gain, resulting in a large current transient flowing from the source 26 towards the cascade multiplier 34 in a forward polarity.

Large input current transients are just one manifestation of the disruption that occurs when a switched capacitor power converter's conversion-gain is changed during operation. Such transients can generate unwanted electromagnetic interference or disturb the external system that supplies the input voltage VI. In addition, the capacitor voltages might deviate higher or lower from the desired target due to the charge redistribution that occurs upon reconfiguration, before settling to the new steady-state levels after several switching cycles. This would normally not be an issue, unless some voltages at the switched capacitor circuit's nodes power support circuitry. As used herein, a rail node is a positive terminal of a capacitors in a cascade multiplier (e.g. nodes N1-N6 in FIG. 2), or a dc node within a dual-phase cascade multiplier (e.g. nodes N1c-N5c in FIG. 5), or the input voltage VI node, or the output voltage VO node. As used herein, adjacent rail nodes refer to pairs of rail nodes wherein the differential voltage is at least an integer multiple of the output voltage VO and is constant at steady-state in both states of operation. Referring to FIG. 2, the nodes N1, N3 (or the nodes VI, N2) are adjacent rail nodes while referring to FIG. 5, the nodes N1c, N2c and the nodes N1a, N2a are adjacent rail nodes.

This property makes it convenient to power low-voltage transistor circuits between adjacent rail nodes. For example, the gate driver and control circuit for each stack switch (e.g. S10-S11) in the cascade multiplier 34 can be powered between adjacent rail nodes (e.g. VI, N1c). If the differential voltage across a set of adjacent rail nodes exceeds the maximum drain-to-source voltage or gate-to-source voltage rating of the transistors during a static or sufficiently long transient event, permanent device damage can occur. Conversely, if this differential voltage falls too close to the transistor threshold voltage, basic transistor functionality might fail or degrade to a point that would adversely affect the performance of the switched capacitor circuit.

For instance, the gate driver output might fail to transition according to its input, or the gate driver's propagation delay increases to an extent that would cause misbehavior elsewhere in the switched capacitor circuit, or the transistor switch might remain too resistive when closed to allow proper power flow. In other words, an under-voltage or over-voltage in the adjacent rail nodes can be an undesirable event and minimizing the magnitude and/or duration of such events caused by reconfiguration becomes necessary.

In a typical switched capacitor circuit, input transients are suppressed by placing a large bypass capacitor between an input voltage VI and ground. Unfortunately, for this technique to be effective, a physically large capacitor is required. With a few modifications and/or additions to the switched capacitor circuits illustrated in FIGS. 2-6, it is possible to suppress input transients that would otherwise occur upon reconfiguration. FIGS. 7A-9C illustrate three novel methods of suppressing input transients for switched capacitor circuits.

Figure 7A:
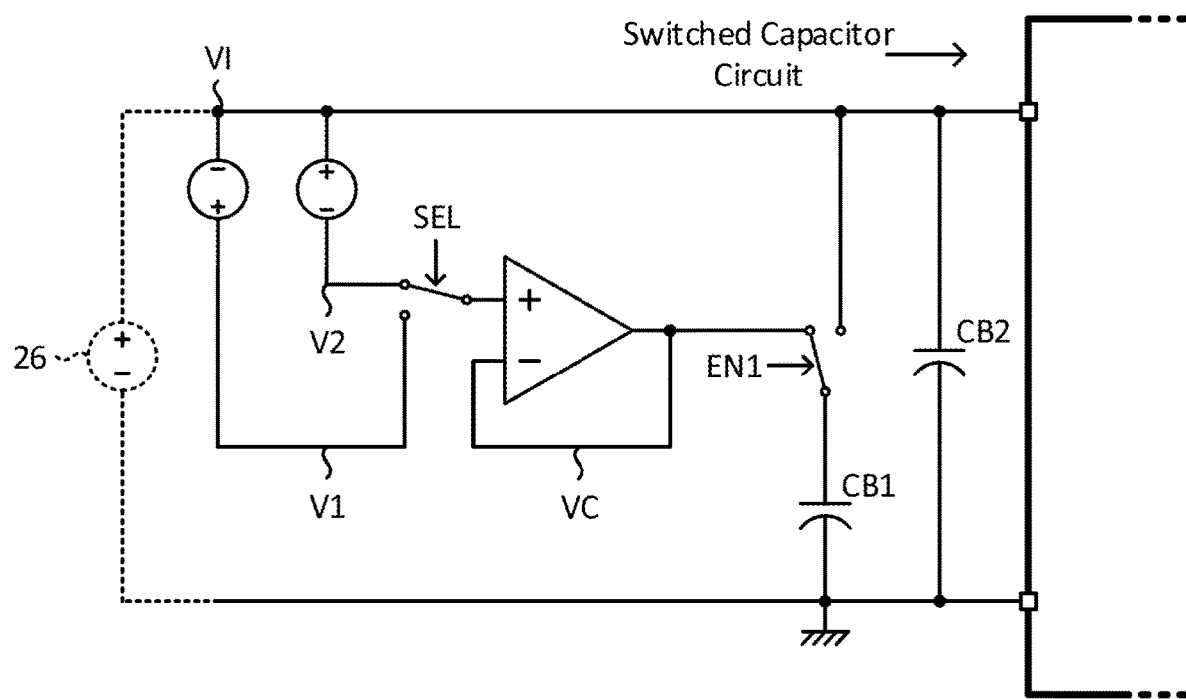
FIGS. 7A-7B show a particular implementation of using a small pre-charged capacitor to suppress input current transients.
Figure 7B:
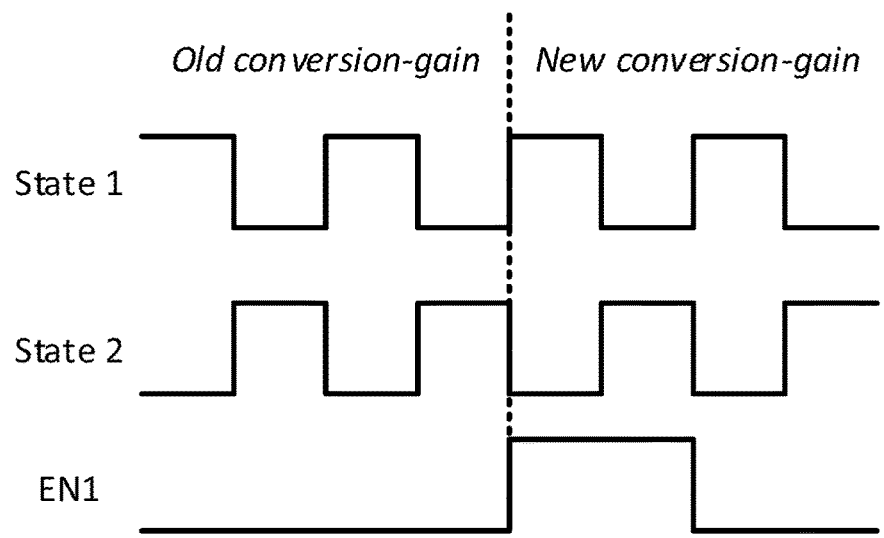

In the first method, a small bypass capacitor CB1 that is small in both volume and value, can suppress large input current transients when used in parallel with a second bypass capacitor CB2 that is typically sized for the application. As illustrated in FIG. 7A, when an enable signal EN1 is set low, the small bypass capacitor CB1 is charged to a pre-charge voltage VC. Just as reconfiguration of the switched capacitor circuit's conversion-gain takes place, the enable signal EN1 is set high and the small bypass capacitor CB1 is connected between the input voltage VI and ground. The small bypass capacitor CB1 will either sink or source current, depending on the polarity of the pre-charge voltage VC compared to the input voltage VI, thereby reducing the amount of charge drawn from or fed back to a source 26 from the switched capacitor circuit. As illustrated in FIG. 7B, the small bypass capacitor CB1 should be connected to the input voltage VI simultaneously with the start of the reconfiguration, and can be disconnected several switching cycles after the reconfiguration. A select signal SEL sets the pre-charge voltage VC. If the select signal SEL is high, the pre-charge voltage VC is set to a first target voltage V1 that is higher than the input voltage VI. Conversely, if the select signal SEL is low, the pre-charge voltage VC is set to a second target voltage V2 that is lower than the input voltage VI.

Depending on the reconfiguration approach and the conversion-gain polarity change, there is an optimal pre-charge voltage VC. Assuming the first reconfiguration approach, if the conversion-gain decreases, then the pre-charge voltage VC should be lower than the input voltage VI (i.e. select signal SEL is low). This allows the small bypass capacitor CB1 that has been charged to the second target voltage V2 to absorb some of the reverse polarity current transient coming from the switched capacitor circuit upon reconfiguration, thereby reducing the magnitude of the input current transient seen by the source 26.

In contrast, if the conversion-gain increases with the first reconfiguration approach, the pre-charge voltage VC should be higher than the input voltage VI (i.e. select signal SEL is high). This allows the small bypass capacitor CB1 that has been charged to the first target voltage V1 to source some of the forward polarity current transient demanded by the switched capacitor circuit upon reconfiguration, thereby reducing the magnitude of the input current transient seen by the source 26. For greater accuracy, the target voltages V1, V2 can take into account the input voltage VI, the conversion-gain, the capacitor values, and the output load current level.

Figure 8:
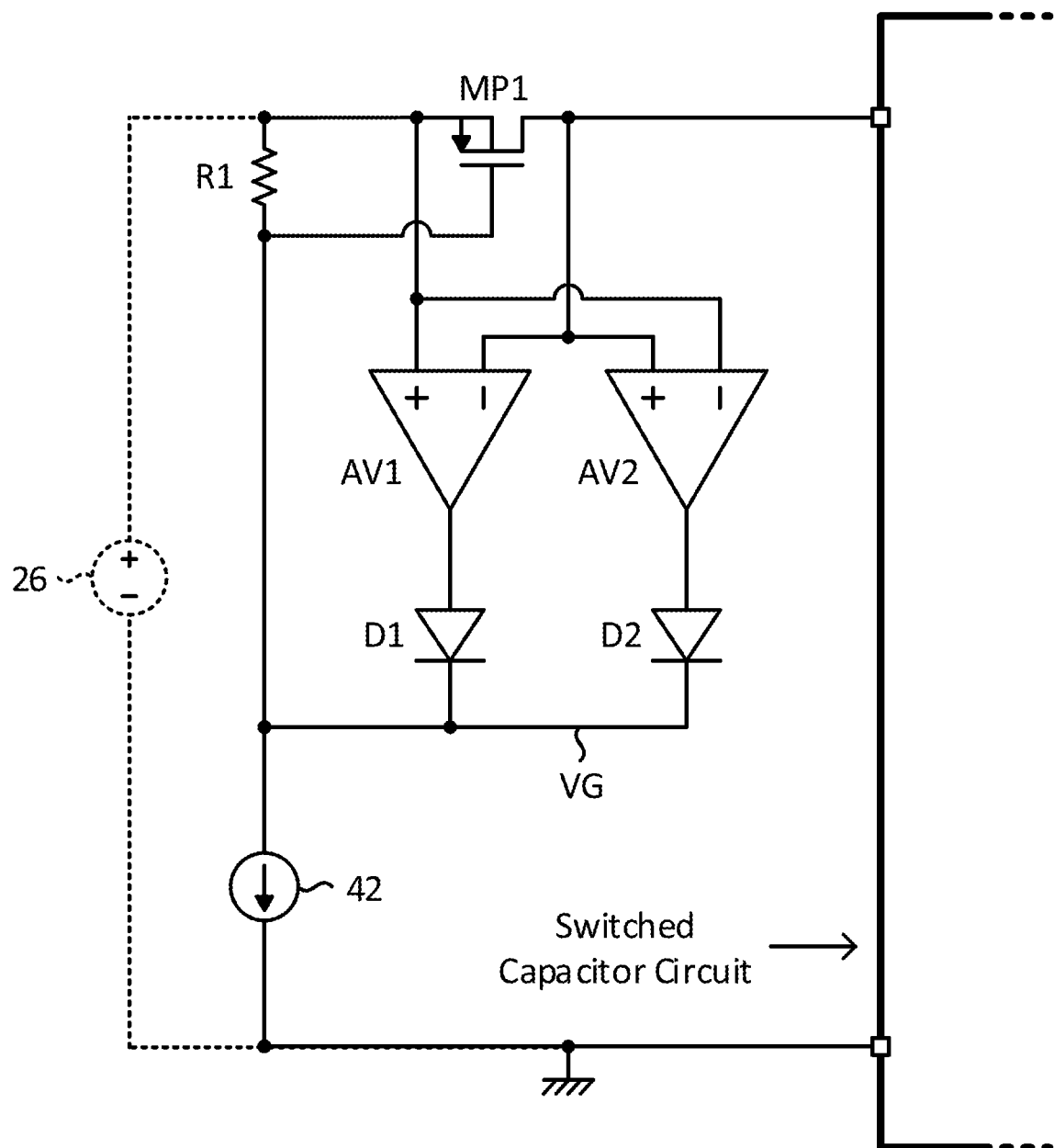
FIG. 8 shows a particular implementation of a bidirectional input current-limited switch.

FIG. 8 shows an alternative method of suppressing an input transient upon a reconfiguration. This method includes a bidirectional current-limited switch MP1 (i.e. PMOS transistor) connected between a source 26 and an input of a switched capacitor circuit. In the control method illustrated in FIG. 8, the current-limited switch MP1 normally operates in the ohmic region until either a first or second current-sense amplifier (AV1 or AV2) detects a forward or reverse polarity input current exceeding a specific current limit level. A resistor R1 and a current source 42 set a steady-state gate voltage VG that biases the current-limited switch MP1 in the ohmic region. When an event exceeding the current limit is detected, either the first current-sense amplifier AV1 or the second current-sense amplifier AV2 drives the gate voltage VG high. This reduces the drive strength of the current-limited switch MP1, thereby limiting the input current magnitude until the transient subsides. The diodes D1, D2 provide the either OR operation at the outputs of the current sense amplifiers AV1, AV2.

Another control method is to open the current-limited switch MP1 for a short period of time upon the reconfiguration or when an input current limit is detected. Unfortunately, when using this control method, there are larger voltage transients at the input of the switched capacitor circuit, which can be mitigated to some extent by adding a bypass capacitor between the input of the switched capacitor circuit (i.e. the drain terminal of the PMOS current-limited switch MP1) and ground.

One more alternative method of suppressing input transients involves modulating the on-resistance of switches within a switched capacitor circuit just before the start of a reconfiguration and up to several switching cycles after. Increasing the on-resistance of the switches does not prevent the charge redistribution that occurs upon the reconfiguration, but minimizes the associated peak current transients by spreading the energy over a longer portion of the switching cycle. Although the efficiency of the switched capacitor circuit suffers due to higher conduction power loss, this is a temporary effect. The on-resistance of the switches can be modulated back to their lowest level after the reconfiguration to maximize the efficiency of the switched capacitor circuit.

Figure 9A:
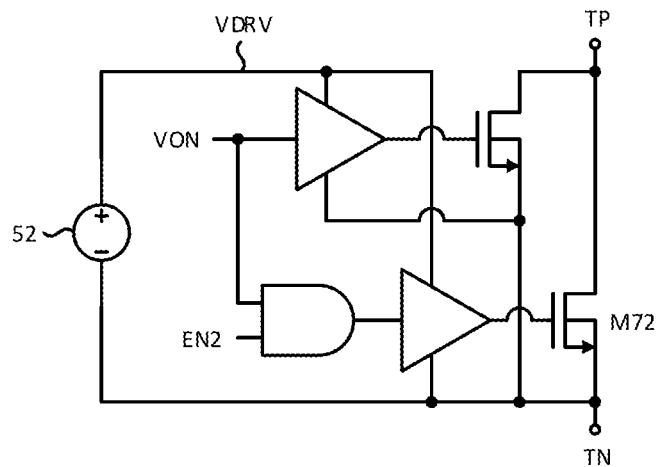
FIGS. 9A-9C show three distinct methods of modulating the on-resistance of a MOSFET.
Figure 9B:
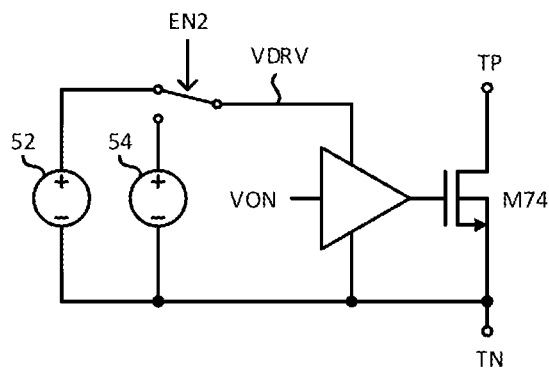
Figure 9C:
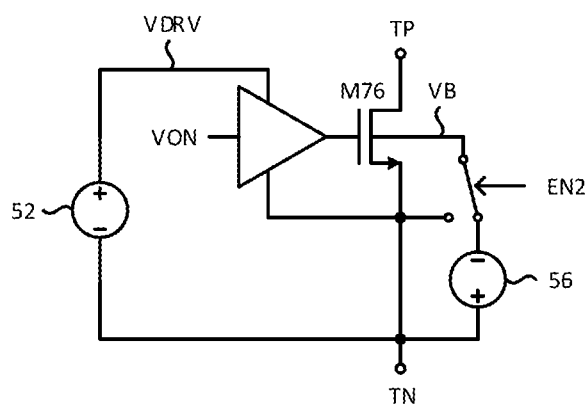

FIGS. 9A-9C illustrate three different methods of modulating the on resistance of a MOSFET between a positive terminal TP and a negative terminal TN when a control voltage VON is high. The on-resistance is equal to either a first resistance value or a second resistance value using an enable signal EN2. In FIG. 9A, the on-resistance between the terminals TP, TN modulates between two values by either disabling or enabling a bottom transistor M72. A corresponding gate driver powered by a voltage source 52 drives the bottom transistor M72 at a drive voltage VDR V. The bottom transistor M72 is enabled when the enable signal EN2 is high and disabled when the enable signal EN2 is low. Therefore, the on-resistance between the terminals TP, TN is lower when the enable signal EN2 is high, in comparison to when the enable signal EN2 is low.

Alternatively, FIG. 9B illustrates a technique wherein the on-resistance between the terminals TP, TN modulates between two values by changing a drive voltage VDRV of a transistor M74. The drive voltage VDRV is provided by a first voltage source 52 when the enable signal EN2 is high and a second voltage source 54 when the enable signal EN2 is low. Assuming, the first voltage source 52 produces a larger electric potential than the second voltage source 54; the on-resistance between the terminals TP, TN is lower when the enable signal EN2 is high, in comparison to when the enable signal EN2 is low.

Lastly, FIG. 9C illustrates a technique wherein the on-resistance between the terminals TP, TN modulates between two values by changing a back-gate voltage VB of a NMOS transistor M76. A corresponding gate driver powered by a voltage source 52 drives the transistor M76 at a drive voltage VDRV. The back-gate terminal of the NMOS transistor M76 is connected to its source (i.e. terminal TN) when the enable signal EN2 is high and connected to a voltage source 56 when the enable signal is low. Because the threshold voltage of the NMOS transistor M76 increases when the source-to-back-gate voltage increases, the on-resistance between the terminals TP, TN is lower when the enable signal EN2 is high, in comparison to when the enable signal EN2 is low.

The on-resistance modulation technique can be applied to all or a subset of the switches in the switched capacitor circuit. Due to the series-connected nature of the stack switches, the control circuitry will have to work between multiple voltage domains, compared to one voltage domain as in the case of the phase switches. From a complexity and die area standpoint, modulating the on-resistance of only the phase switches might be a more attractive solution.

Figure 10A:
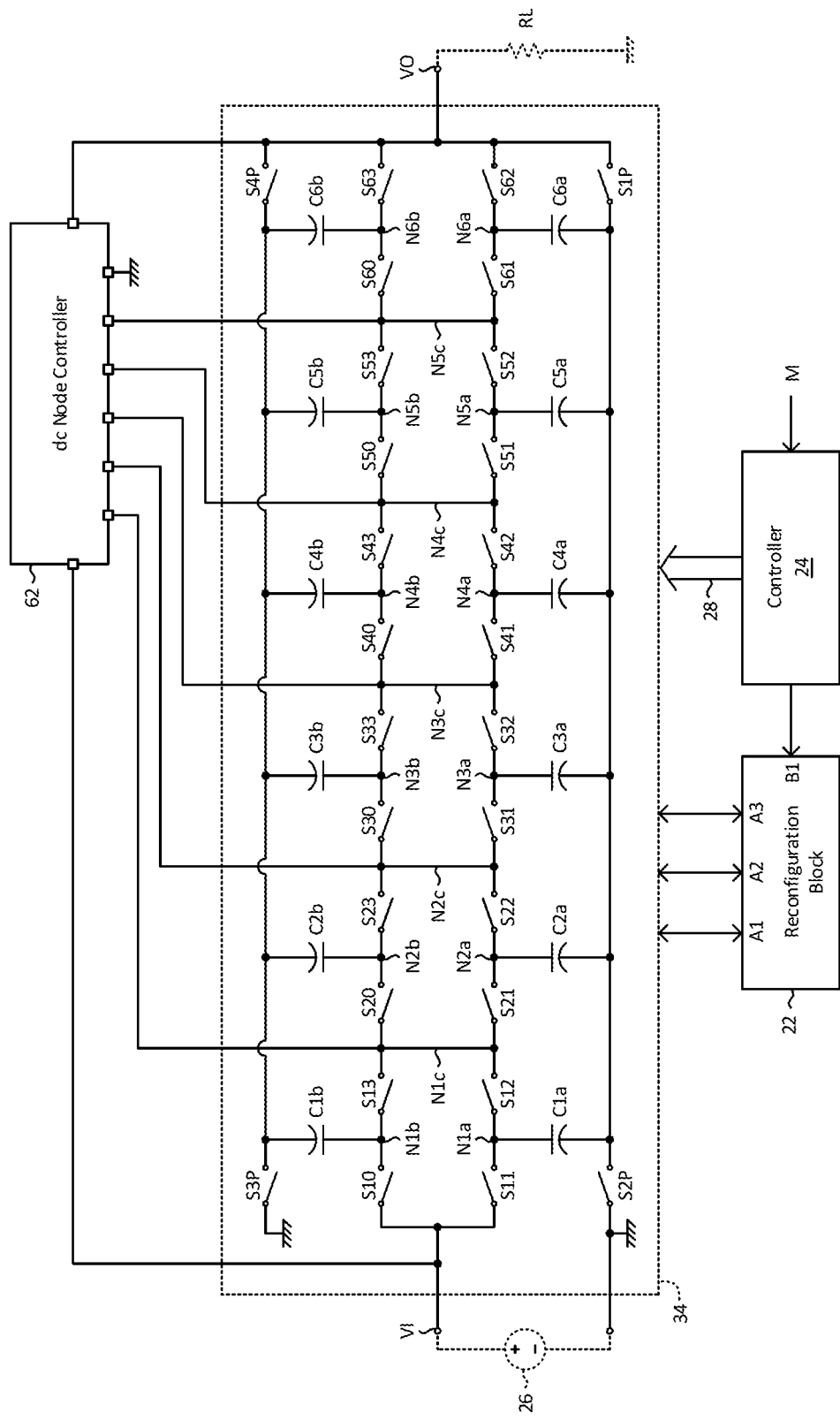
FIG. 10A shows a dc node controller coupled with the dual-phase cascade multiplier in FIG. 5.
Figure 10B:
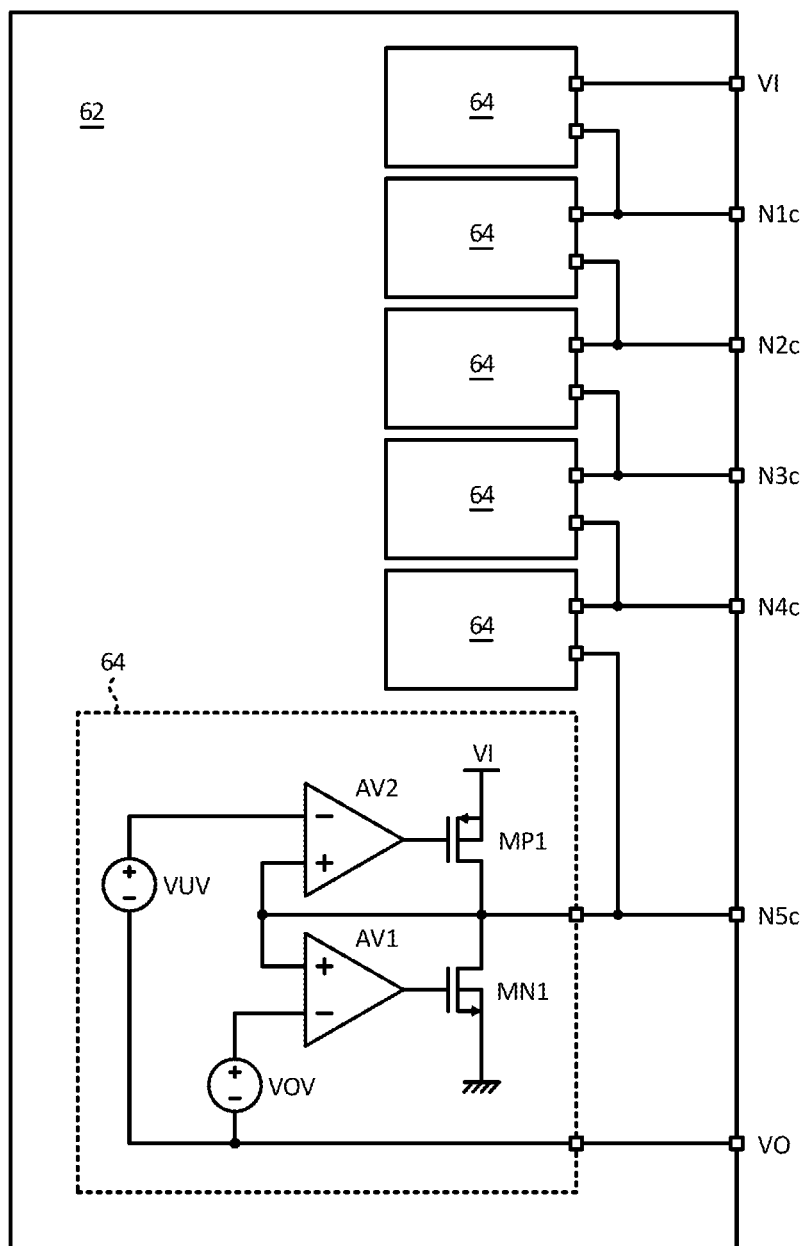
FIG. 10B shows a particular implementation of a dc node controller using voltage clamps.
Figure 10C:
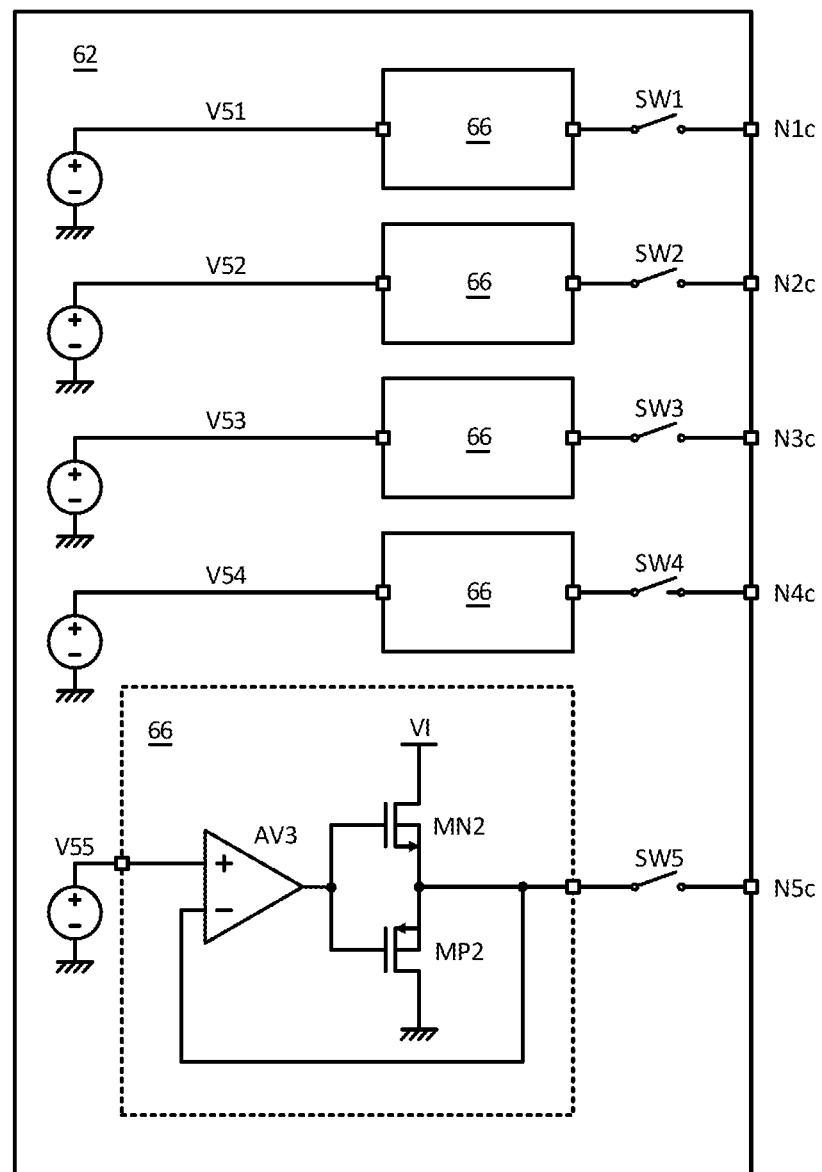
FIG. 10C shows a particular implementation of a dc node controller using voltage regulators.

Special care should be taken with switched capacitor circuits that include cascaded stack switches. Upon a switched capacitor circuit reconfiguration, significant voltage deviations can occur at the dc nodes and over-stress the cascaded stack switches. By actively sensing and controlling the dc nodes, the cascaded stack switches can be protected. For example, FIG. 10A illustrates a controller 62 coupled with the dc nodes N1c-N5c of the cascade multiplier 34, an input voltage VI, and an output voltage VO. Two alternative implementations of the controller 62 are illustrated in FIGS. 10B-10C. Additionally, because a dc node (e.g. N1c) couples with the positive terminal of two capacitors (e.g. C1a, C2b) in any switched capacitor circuit state of operation, controlling the voltage on the dc node also controls the voltage on the two capacitors connected to the dc node in each state of operation.

FIG. 10B shows an implementation of a controller 62 that includes a sub-block 64 across each set of adjacent rail nodes, wherein the differential voltage across each set of adjacent rail nodes is equal to the output voltage VO. Within each sub-block 64, first and second voltage amplifiers AV1, AV2 compare the differential voltage across each set of adjacent rail nodes against an over-voltage threshold VOV and an under-voltage threshold VUV. If the differential voltage (e.g. N5c-VO) rises above or falls below the over-voltage threshold voltage VOV or under-voltage threshold voltage VUV then the sub-block 64 clamps the voltage at the corresponding rail node (e.g. N5c).

The operation of each sub-block 64 in the controller 62 is not too difficult to understand. For example, if the differential voltage across the dc node N5c and the output voltage VO exceeds the over-voltage threshold voltage VOV, the first voltage amplifier AV1 drives the gate of a NMOS transistor MN1 high. This causes the NMOS transistor MN1 to sink current from the dc node N5c, thereby clamping the differential voltage across the dc node N5c and the output voltage VO to the over-voltage threshold voltage VOV. Conversely, if the differential voltage across the dc node N5c and the output voltage VO goes below the under-voltage threshold VOV, the second voltage amplifier AV2 drives the gate of a PMOS transistor MP1 low. This causes the PMOS transistor MP1 to source current into the dc node N5c, thereby clamping the differential voltage across the dc node N5c and the output voltage VO to the under-voltage threshold voltage VUV.

To minimize power dissipation during clamping, the sourcing and sinking clamp currents can be directed between the input voltage VI, the ground, and/or other sub-block 64 terminals. For example, a clamp current from node N2c through the NMOS transistor MN1 in the subblock 64 across the dc nodes N2c, N3c can be redirected to another sub-block 64 across a lower pair of rail nodes (e.g. N4c, N5c) that happens to have a clamp that is simultaneously sourcing current through the PMOS transistor MP1. While active clamps have been proposed before to limit the differential voltage across adjacent rail nodes, these are used only when a switched capacitor circuit is in shutdown mode.

FIG. 10C shows another implementation of a controller 62 that includes a sub-block 66 at each of the dc nodes N1c-N5c. The idea here is to regulate the voltages of the dc nodes N1c-N5c and by extension, the voltage on the capacitors C1a-C6b in the immediate switching cycle(s) upon reconfiguration from the previous steady-state voltages to the levels associated with the new conversion-gain. Each sub-block 66 includes a voltage regulator consisting of a voltage amplifier AV3 connected as a unity-gain follower around a transistor push-pull buffer (MN2, MP2) for current sinking and sourcing capability at the voltage regulator output.

Target voltages V51-V55 for each sub-block 66 determines the regulation voltage levels. When needed, each of the dc nodes N1c-N5c connects to its corresponding sub-block 66 by closing switches SW1-SW5, or can be isolated from normal switched capacitor circuit operation by opening the switches SW1-SW5. The voltage at each of the dc nodes N1c-N5c generally follow the values associated with the voltages across the capacitors C1a-C5b, as listed in Table 6.

The operation of the controller 62 in FIG. 10C is straightforward. When the conversion gain decreases from seven to six using the second reconfiguration approach, each sub-block 66 connects to their corresponding dc nodes N2c-N5c by closing switches SW2-SW5. Assuming, the input voltage VI is equal to 14V, the target voltages V52, V53, V54, V55 change from 10V, 8V, 6V, 4V to 11.67V, 9.33V, 7V, 4.67V, respectively. The sub-block 66 at the de node N1c is unnecessary and the switch SW1 can remain open because the capacitors C1a, C1b are being removed. Ramping the target voltages V52-V55 from one level to the next at a certain slew rate, as opposed to stepping from one voltage level to the next, can further minimize the transients at the nodes of the switched capacitor circuit 34. Furthermore, each sub-block 66 should have sufficient current sourcing or sinking capability to be effective over the full output current range.

As with FIG. 10B, it is possible to redirect some of the current used during regulation of the dc nodes N1c-N5c between different sub-blocks 66 in order to minimize power dissipation. This can be achieved, if there is a combination of dc nodes N1c-N5c requiring opposite polarity voltage changes upon a conversion-gain change. This scenario applies to the third reconfiguration approach, as Table 6 illustrates. For example, if the conversion-gain decreases, the capacitors in the stages above the removed inner capacitor want to reduce their voltage while those in the stages below want to increase their voltage.

By comparison, the voltage on all of the remaining capacitors in the first reconfiguration approach decrease when the conversion-gain decreases. Whereas, the voltage on all of the remaining capacitors in the second reconfiguration approach increase when the conversion-gain decreases. Therefore, the first and second reconfiguration approaches both result in unidirectional current flow within each sub-block. Not all is lost; however, as possibilities remain for recapturing some of this current for the first and second reconfiguration approaches albeit under a narrower range of conditions than for the third reconfiguration approach.

This narrower range exists when each sub-block sinks current from a dc node to reduce its voltage. This applies for the first reconfiguration approach when the conversion-gain decreases and for the second reconfiguration approach when the conversion-gain increases. Under these conditions, each sub-block current can be redirected to the output voltage VO, thereby supplying some of the output load current directly.

In general, the current and voltage transients can be minimized upon reconfiguration if the individual capacitor voltages are brought to be as close as possible to the new steady-state levels associated with the new conversion-gain, before the reconfiguration takes place. After all, charge redistribution is directly proportional to the magnitude of the capacitor voltage difference before and after the reconfiguration event. If this voltage difference can be reduced prior to reconfiguration, then the resulting charge redistribution is smaller which in turn minimizes the current and voltage transients at the nodes within the switched capacitor circuit.

With this in mind, attention should be paid to the event where the conversion-gain increases and a previously removed capacitor is reintroduced to the charge transfer path. As described earlier, there are benefits to keeping some if not all of the removed capacitors pre-charged, in order to limit the maximum voltage differential between certain switched capacitor circuit nodes when low-voltage transistors are used. Depending on the reconfiguration approach selected, the pre-charge voltage of these removed capacitors in relation to the remaining capacitors in the charge transfer path can impact the magnitude of the current transients that occur. Additionally, the pre-charging should not interfere with the normal charge transfer path.

Figure 11:
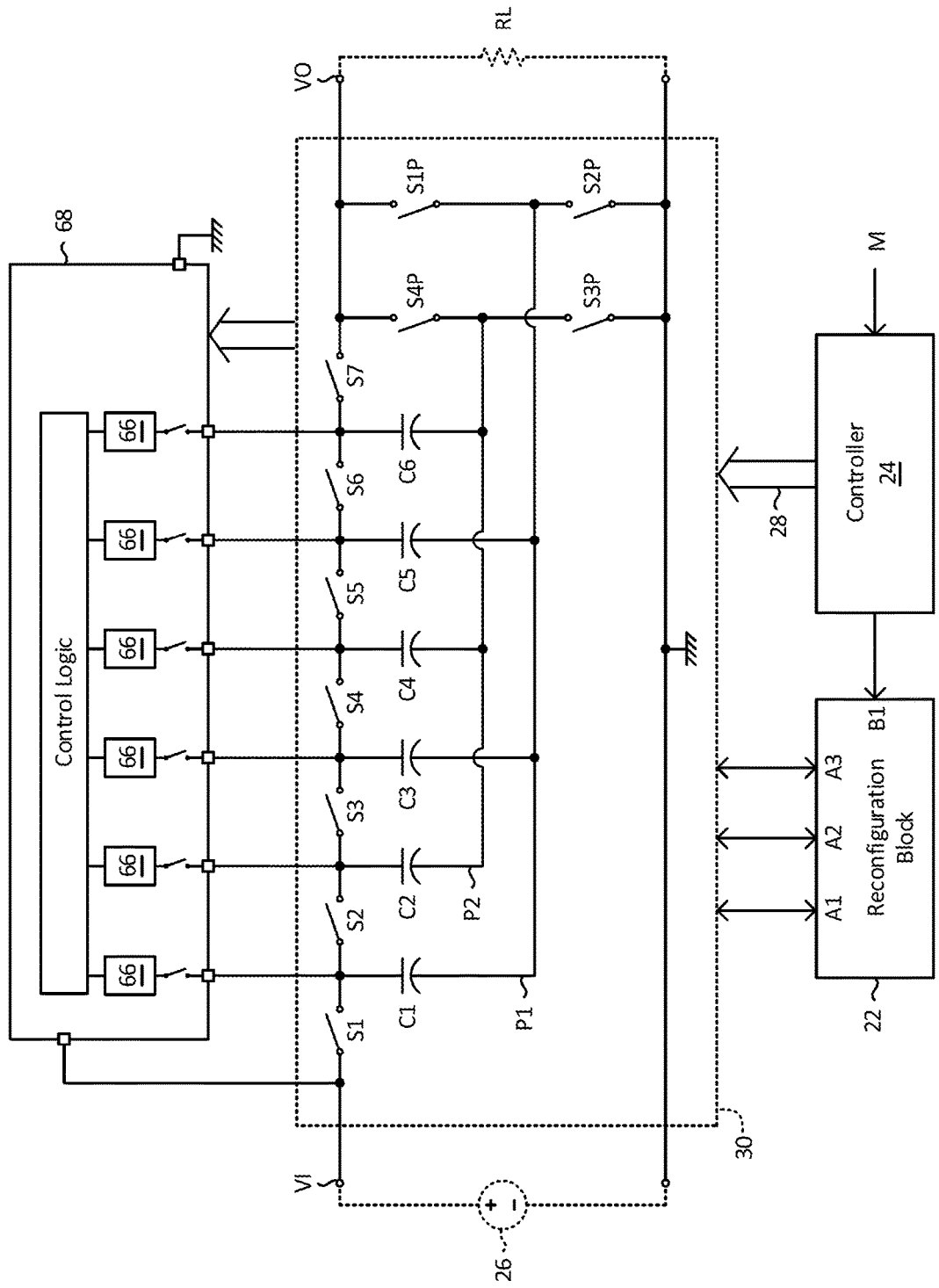
FIG. 11 shows a capacitor pre-charge circuit coupled with the single-phase cascade multiplier in FIG. 2.

FIG. 11 illustrates a capacitor pre-charge circuit 68 coupled with the capacitors C1-C6 in the single-phase cascade multiplier 30. The removed capacitor can be pre-charged in either the first state or the second state of operation because the stack switches at a removed capacitor are always open. However, it might be easier to implement if the removed capacitors are pre-charged during the state when their corresponding phase node is at ground.

The following example assumes the input voltage VI is 14V, the conversion-gain is five, and the removed capacitors C5, C6 (first reconfiguration approach) are pre-charged to the output voltage VO (i.e. 2.8V). Upon a reconfiguration event wherein the conversion-gain changes to six, the excess charge on the capacitor C5 can be used to increase the voltages of the capacitors C1-C4 while transitioning the voltage of the capacitor C5 from 2.8V to 2.33V, thereby reducing the magnitude of the forward polarity input current transient.

Similarly, for the second reconfiguration approach at a conversion-gain of five and an input voltage VI of 14V, the removed capacitors C1, C2 are pre-charged to 11.2V (four times the output voltage VO). Upon a reconfiguration event wherein the conversion-gain changes to six, the excess charge on the capacitors C3-C6 can be used to help increase the voltage of the capacitor C2 voltage from 11.2V to 11.67V, thereby reducing the magnitude of the reverse polarity input current transient.

One can argue that a more sizeable reduction in the input current transient magnitude is achieved if the removed capacitors in the first reconfiguration approach were pre-charged above the output voltage VO or if the removed capacitors in the second reconfiguration approach were pre-charged to less than four times the output voltage VO. While there is merit to this argument, using low-voltage MOS transistors in the switched capacitor circuit imposes a limit on the maximum drain-to-source voltage seen by the switches in the open state, and it is this limit that also constrains the pre-charge voltage.

As for the third reconfiguration approach with a conversion-gain of five and input voltage VI of 14V, the removed capacitors C3, C4 are pre-charged to the same voltages (i.e. 8.4V, 5.6V) as the capacitors C2, C5, respectively. Selecting inner capacitors for reconfiguration that are close to or include the middle stages of the switched capacitor circuit results in an approximately equal number of capacitors that have to increase and decrease their voltages upon a conversion-gain change. Due to this behavior, the third reconfiguration approach will result in lower input current transients than either the first or second reconfiguration approach with all else being equal.

Furthermore, a capacitor pre-charge circuit 68 can be applied to a single-phase switched capacitor circuit with separated phase nodes. The removed capacitors should only be pre-charged in the state where their stack switches are open (see Table 3). In addition to single-phase switched capacitor circuits, multi-phase switched capacitor circuits with separated phase nodes (i.e. FIG. 6) also benefit from using a capacitor pre-charge circuit 68.

Figure 12:
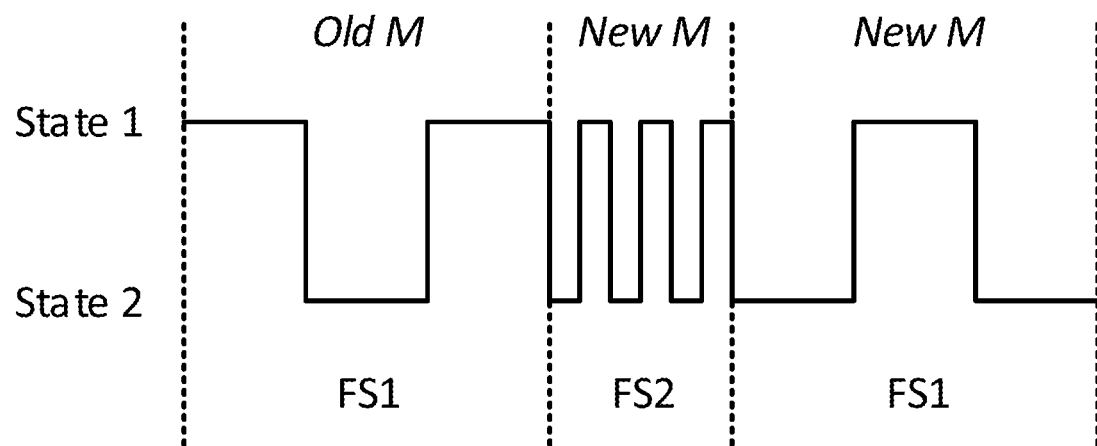
FIG. 12 shows a high-frequency period of operation between the old conversion-gain and the new conversion-gain.

In the event that the current/voltage transients cannot be completely eliminated, it is also helpful to minimize the duration of the transients of the current and voltage transients that can last several switching cycles after a change in the conversion-gain. For example, FIG. 12 illustrates a method of increasing a switched capacitor power converter switching frequency from the normal operation frequency FS1 to a higher frequency FS2 after the reconfiguration for several consecutive cycles, thereby accelerating the charge redistribution process among the remaining capacitors and allowing the capacitor voltages to settle to the new steady-state levels more quickly. Similar to the on-resistance modulation technique, the efficiency of the switched capacitor circuit might decrease at the higher switching frequency, but this is a temporary effect since the switching frequency will eventually revert back to the normal operation frequency FS1.

Figure 13:
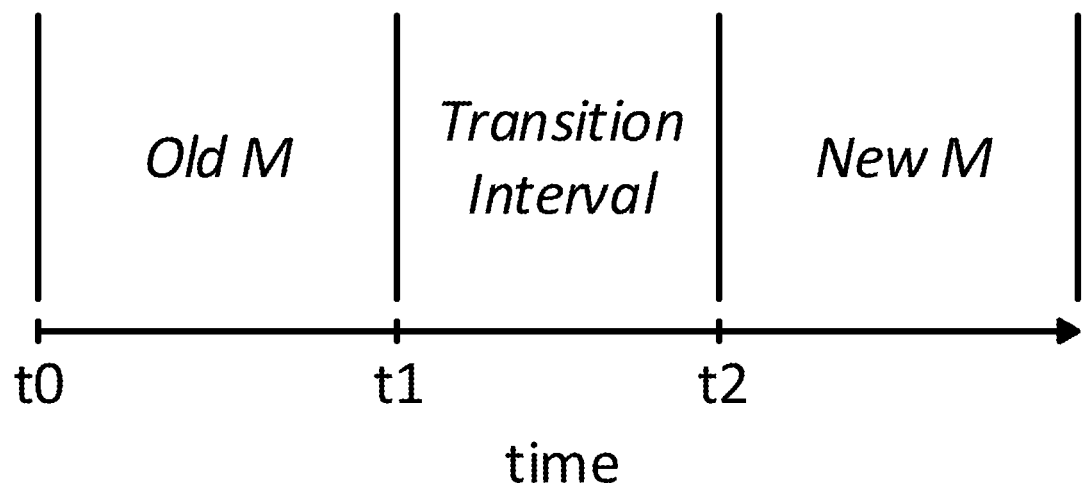
FIG. 13 shows a transition interval between the old conversion-gain and the new conversion-gain.

FIG. 13 illustrates a method of reducing the amount of charge redistribution upon a reconfiguration by introducing a transition interval between the old conversion-gain (i.e. old M) and the new conversion-gain (i.e. new M). During this transition interval, the capacitor voltages can be slewed towards the values associated with the new conversion-gain before the reconfiguration takes place and capacitors are removed from or added to the charge transfer path.

It should be appreciated that this general concept of a transition interval can be applied to a single-phase switched capacitor power converter (e.g. FIG. 2) or a multi-phase switched capacitor power converter (e.g. FIG. 5). Within the transition interval, there are numerous options or techniques that can be used to minimize current and/or voltage transients and these might differ depending on the polarity of the conversion-gain change and the reconfiguration approach selected.

Figure 14B:
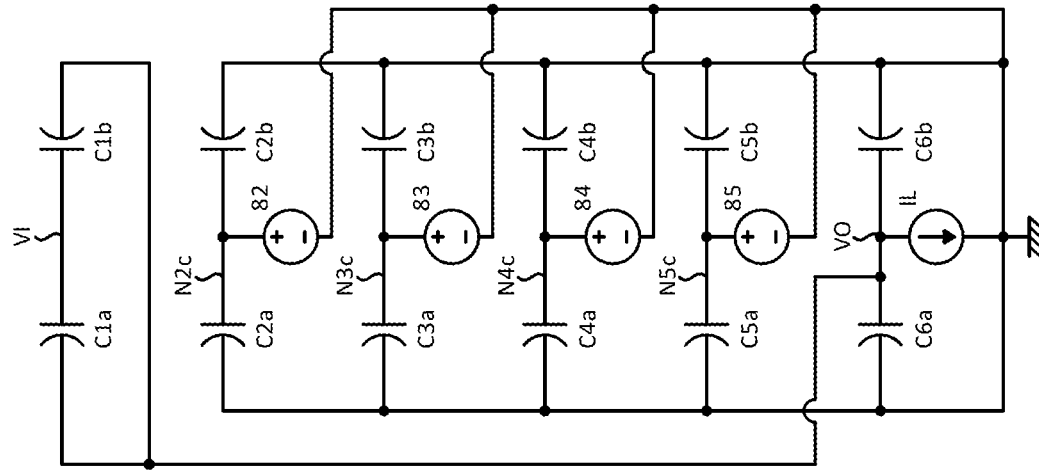
FIGS. 14A-14B show various methods for slewing the capacitor voltages during a transition interval using voltage regulators.
Figure 14A:
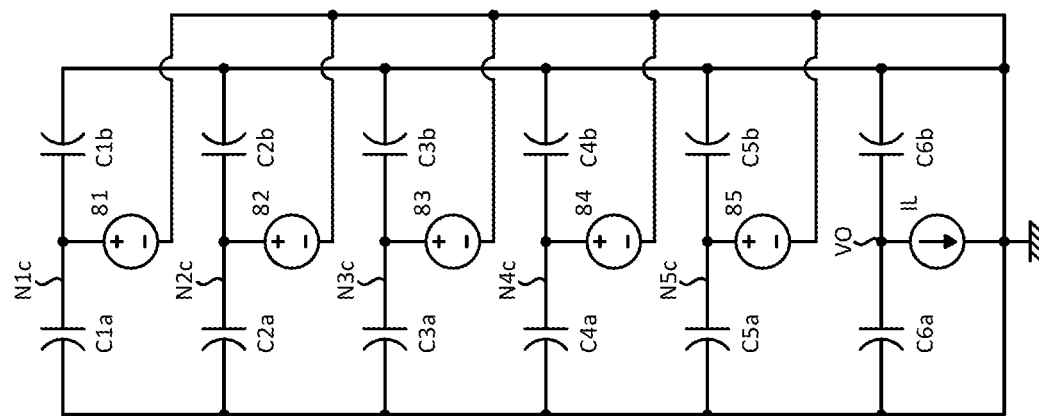

FIGS. 14A-16 illustrate a few distinct methods of operating the dual-phase cascade multiplier 34 during the transition interval. Various combinations of these methods are also possible. In FIGS. 14A-14B, voltage sources are used, in reality, the ideal voltage sources can implemented using circuits that emulate their behavior, such as a voltage regulator or a switched capacitor circuit.

FIG. 14A illustrates a voltage source implementation during the transition interval. Upon the start of a reconfiguration, but prior to the removal or addition of capacitors, the voltages at the dc nodes N1c-N5c are slewed in a controlled manner throughout the transition interval to the new steady-state voltages of the new conversion-gain. During the transition interval, all phase nodes are connected to ground while the stack switches of each common-stage pair of capacitors are closed in such a way as to connect together the positive terminals of each common-stage pair of capacitors to the corresponding dc nodes N1c-N5c and the output voltage VO.

Referring to FIG. 5, this means closing the stack switches S12, S13 while opening the stack switches S10, S11 for the first stage capacitors C1a, C1b; closing the stack switches S22, S23 while opening the stack switches S20, S21 for the second stage capacitors C2a, C2b; and so on. Voltage sources 81-85 connected to each of the dc nodes N1c-N5c slew the voltage on the capacitors C1a-C5b in a controlled manner towards the values associated with the new conversion-gain. Once the capacitors reach the target values, reconfiguration of the switched capacitor circuit by removing or adding capacitors to the charge transfer path can commence. The last stage capacitors C6a-C6b remain connected between the output voltage VO and ground in order to supply the output load current IL and prevent the output voltage VO from drooping excessively.

Unfortunately, there is no direct power path from the input voltage VI to the output voltage VO in FIG. 14A. However, if the phase nodes corresponding to the capacitors C1a, C1b are separated from the remaining phase nodes then it is possible to form the configuration as illustrated in FIG. 14B. By placing the capacitors C1a, C1b in between the input voltage VI and the output voltage VO, power flow can be maintained during the transition interval, thereby reducing the peak-to-peak ripple of the output voltage VO when compared to the implementation illustrated in FIG. 14A.

Figure 15C:
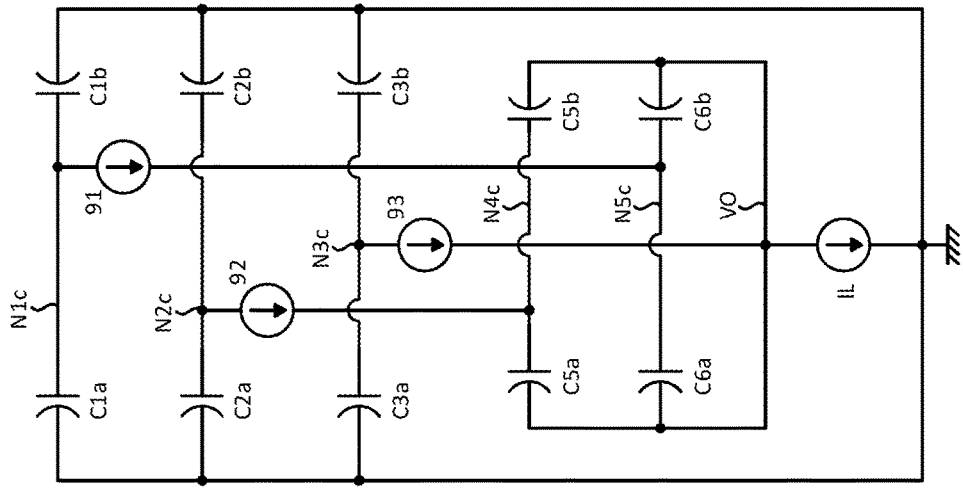
FIGS. 15A-15C show various methods for slewing the capacitor voltages during a transition interval using current regulators.
Figure 15B:
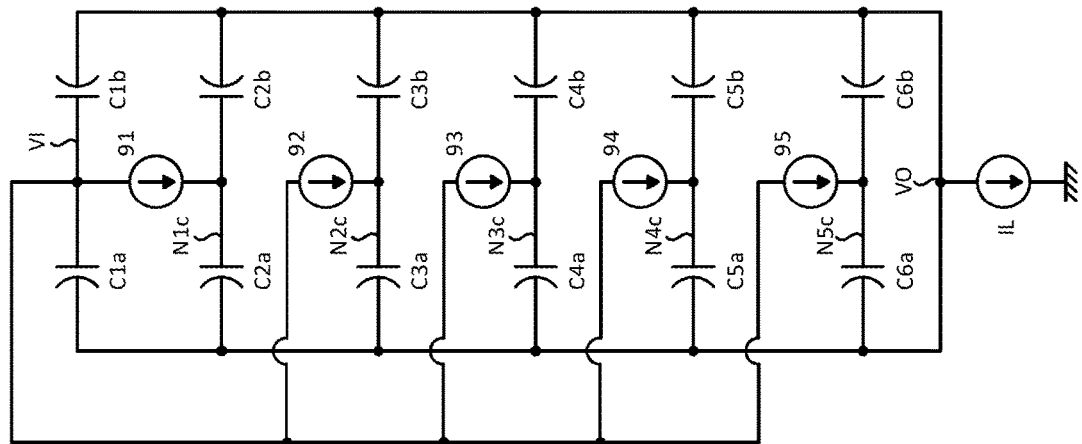
Figure 15A:
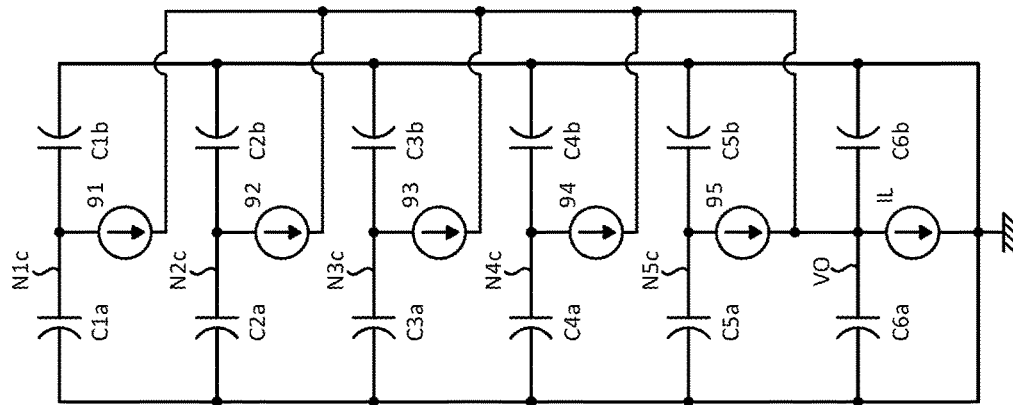

Alternatively, it is possible to use current sources to slew each capacitor voltage in a controlled manner during the transition interval. FIGS. 15A-15C illustrate particular implementations for each of the three distinct reconfiguration approaches using ideal current sources. In reality, the ideal current sources can implemented using circuits that emulate their behavior, such as a current regulator or a current mirror. As in FIGS. 14A-14B, the dual-phase cascade multiplier 34 is utilized to demonstrate the technique. However, this technique is applicable to other types of switched capacitor circuits (e.g. single-phase cascade multipliers).

FIG. 15A illustrates a particular implementation during the transition interval wherein currents sources are used to slew the voltages on the capacitors C1a-C6b for the first reconfiguration approach. If the conversion-gain reduces from seven to six, the voltages on the capacitors C1a-C6b should decrease. Therefore, during the transition interval, the phase nodes P1, P2 are connected to ground while the stack switches are operated in such a way to connect the positive terminals of each common-stage pair of capacitors to their corresponding dc nodes N1c-N5c. Referring to FIG. 5, this means closing the stack switches S12, S13 while opening the stack switches S10, S11 for the first stage capacitors C1a, C1b; closing the stack switches S22, S23 while opening the stack switches S20, S21 for the second stage capacitors C2a, C2b; and so on. Current sources 91-95 connected from each of the dc nodes N1c-N5c to the output voltage VO discharge the capacitors in a linear manner.

Starting with the first stage capacitors (i.e. C1a, C1b) and through to the post-reconfiguration last stage capacitors (C5a, C5b at conversion-gain of six), the amount of capacitor voltage reduction increases sequentially in increasing integer multiples of $VI/[M \times (M+1)]$, where M is equal to the new conversion-gain after reconfiguration. For a given transition interval duration that is common to all capacitors, the magnitude of the currents should therefore increase sequentially in integer multiples from the current source 91 to the current source 95. Due to Kirchhoff's current law, the load current IL is equal to the sum of the current sources 91-95 and the current through the capacitors C6a, C6b.

FIG. 15B illustrates a particular implementation during the transition interval wherein currents sources are used to slew the voltages on the capacitors C1a-C6b for the second reconfiguration approach. If the conversion-gain reduces from seven to six, the voltages on the capacitors C1a-C6b should increase. Therefore, during the transition interval, the phase nodes P1, P2 are connected to the output voltage VO while the stack switches are operated in such a way to connect the positive terminals of each common-stage pair of capacitors to their corresponding dc nodes N1c-N5c. Referring to FIG. 5, this means closing the stack switches S10, S11 while opening the stack switches S12, S13 for the first stage capacitors C1a, C1b; closing the stack switches S20, S21 while opening the stack switches S22, S23 for the second stage capacitors C2a, C2b; and so on. Current sources 91-95 connected from the input voltage VI to each of the dc nodes N1c-N5c charge the capacitors in a linear manner.

Starting with the post-reconfiguration first stage capacitors (C2a, C2b at conversion-gain of six) and through to the last stage capacitors (i.e. C6a, C6b), the increase in capacitor voltage decreases sequentially in decreasing integer multiples of VI/[M×(M+I)], where M is equal to the new conversion-gain after reconfiguration. For a given transition interval duration that is common to all capacitors, the magnitude of the currents should therefore decrease sequentially in integer multiples from the current source 91 to the current source 95. Due to Kirchhoff's current law, the load current IL is equal to the sum of the current sources 91-95 and the current through the capacitors C1a, C1b.

FIG. 15C illustrates a current source implementation during the transition interval for the third reconfiguration approach (involving C3a, C3b, C4a, C4b) upon a reduction in the conversion-gain from six to five. The capacitors C4a, C4b are assumed to have already been removed from a prior reconfiguration, wherein the conversion-gain changed from seven to six. During the transition interval, the voltage on each of the capacitors C1a, C1b, C2a, C2b should decrease, conversely, the voltage on each of the capacitors C5a, C5b, C6a, C6b should increase.

This particular example assumes a dual-phase cascade multiplier with separated phase nodes to achieve a low-power dissipation transition interval wherein current sources 91-93 are used to charge and discharge the capacitors C1a-C6b. The current sources 91-93 are summed at the input voltage VO to supply a load current IL. With shared phase nodes, this transition interval will dissipate more power since the current sources 91, 92 might not be recycled as easily.

During the transition interval, the phase nodes of the corresponding capacitors C5a, C5b, C6a, C6b are connected to the output voltage VO while the phase nodes of the remaining capacitors are connected to ground. Furthermore, the current source 91 simultaneously discharges the capacitors C1a, C1b and charges the capacitors C6a, C6b while the current source 92 simultaneously discharges the capacitors C2a, C2b and charges the capacitors C5a, C5b. For this to work, the magnitude of the current source 92 should be an integer multiple larger than the magnitude of the current source 91.

Figure 16:
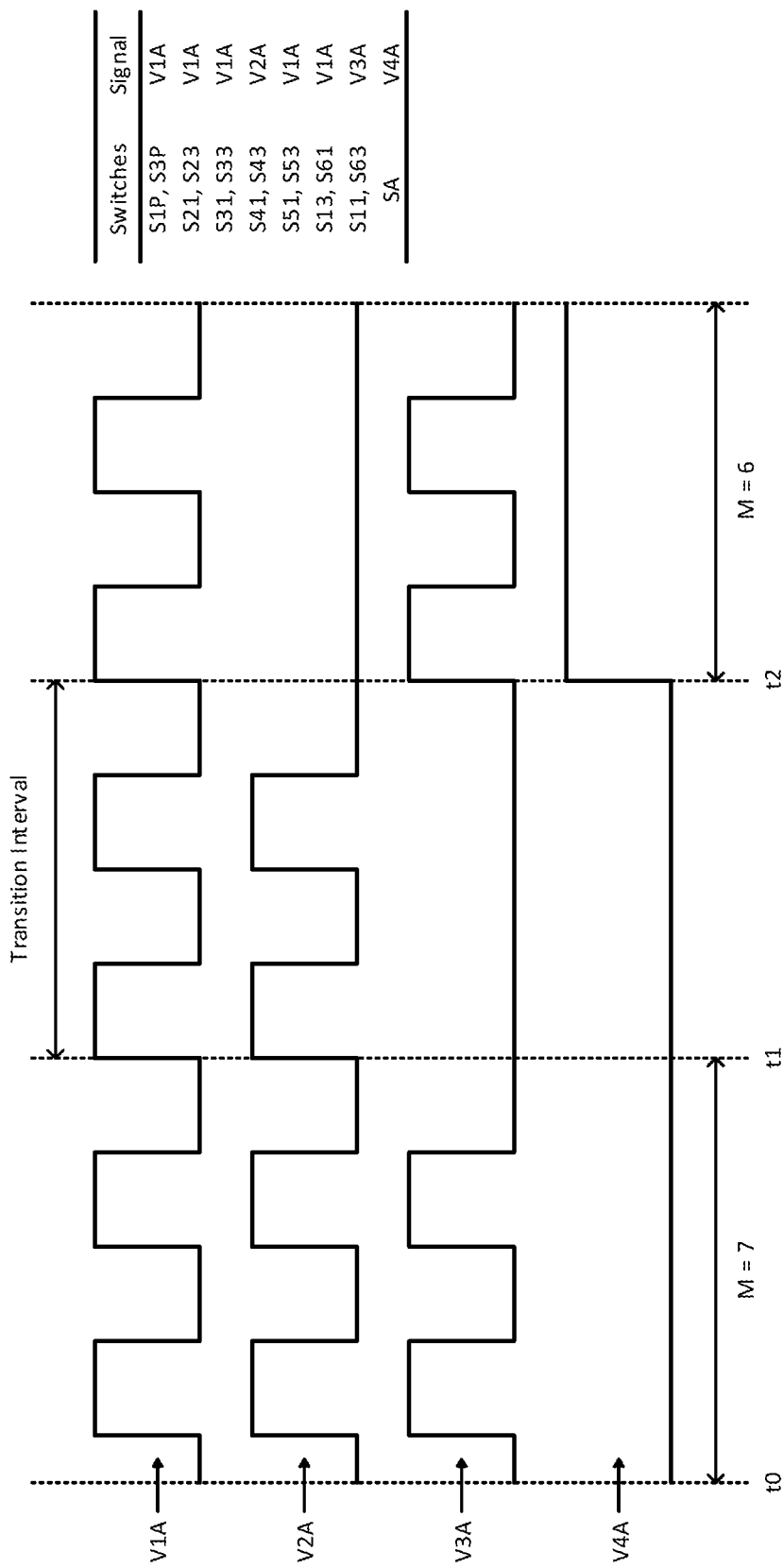
FIG. 16 shows a particular switching scheme during a transition interval.

Instead of using additional voltage or current sources to slew the capacitor voltages during the transition interval, it possible to use the load current IL directly for this same purpose. By applying a time-based skew to selected capacitors, it is possible to changes their voltage in a desired direction beyond steady-state. For example, FIG. 16 illustrates a sample timing-diagram for the dual-phase cascade multiplier 34 during the transition interval from time t1 to time t2, wherein the conversion-gain changes from seven to six using the third reconfiguration approach. It should be noted that only the corresponding signals for the first phase are illustrated in FIG. 16.

In normal operation during the transition interval, there is a first state and a second state that are repeated at a specific frequency. Additionally, the stack switches S10, S11, S63, S62 are open the whole time during the transition interval. Consequently, the capacitors C1a, C1b only discharge when connected in series with the capacitors C2b, C2a, but do not charge from the input voltage VI, resulting in a net outflow of charge and a decrease in capacitor voltage. Conversely, the capacitors C6a, C6b only charge when connected in series with the capacitors C5b, C5a, but do not discharge to the output voltage VO, resulting in a net inflow of charge and an increase in capacitor voltage.

Fortunately, in the third reconfiguration approach, a decrease in conversion-gain results in lower voltages across the capacitors C1a, C1b, but higher voltages across the capacitors C6a, C6b. Therefore, when the reconfiguration takes place, the resulting charge redistribution is smaller than it would have been without the transition interval and the time-based skew at the outer capacitors C1a, C1b, C6a, C6b.

The duration of the transition interval can be as short as one switching cycle or some integer multiple of switching cycles (e.g. multiple of two of the duration from time t1 to time t2). Although it is not necessary for the duration of the transition interval to be an integer multiple of the switched capacitor power converter switching cycle, there can be advantages in terms of timing synchronization and operation symmetry.

Additionally, the time-based skew technique is suitable for the other reconfiguration approaches as well. For example, when the conversion-gain changes from seven to six using the first reconfiguration approach, the capacitors C6a, C6b are removed and the voltages across the remaining capacitors decrease. Since the voltages across the capacitors C1a, C1b reduces during the transition interval, the resulting charge redistribution upon reconfiguration is smaller, thereby reducing the magnitude of the corresponding current and voltage transients.

Unfortunately, reducing charge redistribution using the time-based skew technique is inherently limited because only the voltages on the outer capacitor are changed during the transition interval. Furthermore, the maximum or minimum tolerated ripple amplitude at the output voltage VO might limit the magnitude of the outer capacitor voltage change during the transition interval. In any case, it might be possible to customize the duration of the transition interval as a function of the output current magnitude and the switched capacitor circuit frequency in order to maximize the benefit of this method.

Various features, aspects, and embodiments of switched capacitor power converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expressions which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention, and a preferred embodiment thereof, what is claimed is:

1. An integrated circuit, comprising:
   a switched capacitor circuit having a set of switches configured to form at least a portion of a step-down voltage converter, wherein the set of switches is configured to couple to a set of capacitors arranged to form a configuration such that at least some switches in the set of switches operate in a manner to form an electrical connection of at least some of the capacitors to respective alternate voltages in successive stages of operation of the step-down voltage converter;

a current-limited switch coupled to a source and the switched capacitor circuit; and a sense circuit connected to the current-limited switch and configured to detect an input current exceeding a current limit level, wherein the current-limited switch is configured to suppress an electrical input to the switched capacitor circuit upon the sense circuit detecting the input current exceeding the current limit level.

2. The integrated circuit of claim 1, wherein the sense circuit is further configured to drive a steady-state gate voltage high when the input current exceeds the current limit level or the sense circuit is configured to drive the steady-state gate voltage low when the input current exceeds the current limit level, wherein the steady-state gate voltage driven high or low reduces a drive strength of the current-limited switch.

3. The integrated circuit of claim 1, wherein to suppress the electrical input to the switched capacitor circuit comprises reducing a current value and/or a voltage value.

4. The integrated circuit of claim 1, further comprising:
a resistor connected to the current-limited switch; and
a current source connected to the resistor, wherein the resistor and the current source are configured to set a steady-state gate voltage that biases the current-limited switch to an ohmic region.

5. The integrated circuit of claim 1, wherein the current-limited switch is a bi-directional current-limited switch configured to handle a high voltage.

6. The integrated circuit of claim 1, further comprising:
a second sense circuit connected to the current-limited switch and configured to detect a second input current exceeding a second current limit level, and
wherein the current-limited switch is further configured to suppress the electrical input in the switched capacitor circuit upon the second sense circuit detecting the second input current exceeding the current limit level.

7. The integrated circuit of claim 6, further comprising:
a first diode in a sequence with the sense circuit; and
a second diode in a sequence with the second sense circuit, wherein the first diode and the second diode provide an either OR operation to outputs of the sense circuit and the second sense circuit.

8. The integrated circuit of claim 1, wherein the current-limited switch is configured to suppress the electrical input to the switched capacitor circuit during a normal operation of the step-down voltage converter.

9. The integrated circuit of claim 1, wherein the step-down voltage converter is a charge pump.

10. An integrated circuit, comprising:
a current-limited switch coupled to a source and a switched capacitor circuit; and
at least one current-sense amplifier connected to the current-limited switch and configured to measure an input current,
wherein the current-limited switch is configured to control an electrical input to the switched capacitor circuit upon the at least one current-sense amplifier measuring the input current above a current limit level.

11. The integrated circuit of claim 10, wherein the at least one current-sense amplifier is configured to drive a steady-state gate voltage high when the input current is above the current limit level.

12. The integrated circuit of claim 10, wherein the at least one current-sense amplifier is configured to drive a steady-state gate voltage low when the input current is above the current limit level.

13. The integrated circuit of claim 10, wherein the current-limited switch is a charge pump.

14. The integrated circuit of claim 13, wherein the charge pump is a reconfigurable charge pump.

15. The integrated circuit of claim 14, wherein the charge pump is a bi-directional charge pump.

16. The integrated circuit of claim 10, wherein the current-limited switch is a bi-directional current-limited switch.

17. The integrated circuit of claim 10, wherein the current-limited switch is a PMOS transistor and wherein a source of the PMOS transistor is connected to the at least one current-sense amplifier.

18. The integrated circuit of claim 10, wherein the current-limited switch is further configured to limit the electrical input to the switched capacitor circuit upon the at least one current-sense amplifier measuring the input current above a second current limit level.

19. The integrated circuit of claim 10, wherein the switched capacitor circuit further comprises a set of switches configured to form at least a portion of a step-down voltage converter, wherein the set of switches is configured to couple to a set of capacitors arranged to form a configuration such that at least some switches in the set of switches operate in a manner to form an electrical connection of at least some of the capacitors to respective alternate voltages in successive stages of operation of the step-down voltage converter.

20. A method, comprising:
providing a voltage from a voltage source to a switched capacitor circuit coupled to an integrated circuit, the integrated circuit comprising:
a current-limited switch connected between the voltage source and the switched capacitor circuit; and
at least one current-sense amplifier connected to the current-limited switch;
measuring, at the at least one current-sense amplifier, an input current; and
controlling an electrical input to the switched capacitor circuit once the measured input current is above a current limit level.

21. The method of claim 20, further comprising:
driving, using the at least one current-sense amplifier, a steady-state gate voltage high when the input current is above the current limit level; or
driving, using the at least one current-sense amplifier, the steady-state gate voltage low when the input current is above the current limit level.

22. The method of claim 20, wherein the switched capacitor circuit further comprises a set of switches configured to form at least a portion of a step-down voltage converter, wherein the set of switches is configured to couple to a set of capacitors arranged to form a configuration such that at least some switches in the set of switches operate in a manner to form an electrical connection of at least some of the capacitors to respective alternate voltages in successive stages of operation of the step-down voltage converter.

* * * * *

UNITED STATES PATENT AND TRADEMARK OFFICE
CERTIFICATE OF CORRECTION

PATENT NO. : 12,218,586 B2
APPLICATION NO. : 18/606285
DATED : February 4, 2025
INVENTOR(S) : Aichen Low et al.

Page 1 of 1

It is certified that error appears in the above-identified patent and that said Letters Patent is hereby corrected as shown below:

In the Specification

Column 6, Line 55, change "switches SIP, S3P are open" to --switches S1P, S3P are open--.

Column 8, Line 52, change "the phase switches SIP-S4P and stack" to --the phase switches S1P-S4P and stack--.

Column 11, Line 30, change "phase switches SIP-S4P stay open" to --phase switches S1P-S4P stay open--.

Column 11, Line 57, change "switches SIP, S4P in both state" to --switches S1P, S4P in both state--.

Column 12, Line 61, change "switch SIP (e.g. NMOS)" to --switch S1P (e.g. NMOS)--.

Column 13, Line 51, change "phase switches SIP, S3P are" to --phase switches S1P, S3P are--.

Column 20, Line 34, change "voltage across the de node" to --voltage across the dc node--.

Column 20, Line 40, change "current into the de node" to --current into the dc node--.

Column 21, Line 66, change "which in turn minimizes" to --which in turn minimizes the--.

Signed and Sealed this
Eighteenth Day of March, 2025

Coke Morgan Stewart
*Acting Director of the United States Patent and Trademark Office*